United States Patent
Patel et al.

(10) Patent No.: US 11,330,619 B2
(45) Date of Patent: May 10, 2022

(54) LOW LATENCY PHYSICAL UPLINK CONTROL CHANNEL WITH SCHEDULING REQUEST AND CHANNEL STATE INFORMATION

(71) Applicant: QUALCOMM Incorporated, San Diego, CA (US)

(72) Inventors: Shimman Arvind Patel, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/158,182

(22) Filed: Oct. 11, 2018

(65) Prior Publication Data

US 2019/0069316 A1    Feb. 28, 2019

Related U.S. Application Data

(62) Division of application No. 15/169,420, filed on May 31, 2016, now Pat. No. 10,123,349.

(Continued)

(51) Int. Cl.
*H04W 72/12* (2009.01)
*H04L 5/00* (2006.01)
(Continued)

(52) U.S. Cl.
CPC ....... *H04W 72/1294* (2013.01); *H04L 1/0027* (2013.01); *H04L 1/1671* (2013.01);
(Continued)

(58) Field of Classification Search
None
See application file for complete search history.

(56) References Cited

U.S. PATENT DOCUMENTS 8,830,883 B2   9/2014  Chen et al.
8,861,408 B2  10/2014  Damnjanovic et al.
(Continued)

FOREIGN PATENT DOCUMENTS

CN   101431774 A   5/2009
CN   102158981 A   8/2011
(Continued)

OTHER PUBLICATIONS

Lucent-A., et al., "Comparison Between DRX and Gap-Like Mechanism for IDC TDM Solution", 3GPP Draft; R2-121694 GAPVSDRX, 3rd Generation Partnership Project (3GPP), Mobile Competence Centre; 650, Route Des Lucioles; F-06921 Sophia-Antipolis Cedex; France, vol. RAN WG2, No. Jeju, Korea; Mar. 26, 2012-Mar. 30, 2012, Mar. 19, 2012 (Mar. 19, 2012), XP050606108, [retrieved on Mar. 19, 2012].

(Continued)

*Primary Examiner* — Saumit Shah
(74) *Attorney, Agent, or Firm* — Dalei Dong; Holland & Hart LLP

(57) ABSTRACT

Methods, systems, and devices for wireless communication are described. A user equipment (UE) and a base station may use low latency communications to improve the throughput of a wireless link. To facilitate efficient low latency communication, the UE may send UE-initiated CSI reports in addition to periodic and base station-initiated reports. For example, the UE may, in various examples, send UE-initiated CSI reports using contention based spectrum, using a request-to-transmit, or using a CSI differential (i.e., an indicator of a change in channel conditions). The base station may schedule different UEs for uplink low latency communication by providing resources to each UE for CSI and scheduling requests (SRs) using coherent or non-coher- (Continued)

ent uplink transmissions. The CSI and SR may also be combined with uplink feedback.

15 Claims, 21 Drawing Sheets

Related U.S. Application Data

(60) Provisional application No. 62/190,506, filed on Jul. 9, 2015.

(51) Int. Cl.
| | |
|---|---|
| *H04L 1/00* | (2006.01) |
| *H04L 1/16* | (2006.01) |
| *H04L 1/18* | (2006.01) |
| *H04W 72/02* | (2009.01) |
| *H04W 74/08* | (2009.01) |

(52) U.S. Cl.
CPC .......... *H04L 1/1812* (2013.01); *H04L 5/0053* (2013.01); *H04W 72/02* (2013.01); *H04W 72/1231* (2013.01); *H04W 72/1268* (2013.01); *H04L 1/0026* (2013.01); *H04L 1/0029* (2013.01); *H04W 74/08* (2013.01)

(56) References Cited

U.S. PATENT DOCUMENTS

| | | | |
|---|---|---|---|
| 10,187,876 B2 | 1/2019 | Chen et al. | |
| 10,911,189 B2 | 2/2021 | Wang et al. | |
| 2008/0268860 A1 | 10/2008 | Lunttila et al. | |
| 2010/0271970 A1 | 10/2010 | Pan et al. | |
| 2011/0216713 A1 | 9/2011 | Kim et al. | |
| 2011/0319068 A1 | 12/2011 | Kim et al. | |
| 2012/0257605 A1* | 10/2012 | Abraham | H04L 5/0094 370/338 |
| 2013/0058282 A1 | 3/2013 | Miki et al. | |
| 2013/0070723 A1* | 3/2013 | Yie | H04B 7/0639 370/329 |
| 2013/0077514 A1 | 3/2013 | Dinan | |
| 2013/0148611 A1 | 6/2013 | Moulsley et al. | |
| 2013/0301420 A1 | 11/2013 | Zhang et al. | |
| 2014/0071954 A1 | 3/2014 | Au et al. | |
| 2014/0301324 A1 | 10/2014 | Cheng et al. | |
| 2015/0156764 A1 | 6/2015 | Yang et al. | |
| 2016/0029238 A1* | 1/2016 | Chen | H04W 24/10 370/252 |
| 2016/0094315 A1 | 3/2016 | Noh et al. | |
| 2016/0212786 A1 | 7/2016 | Hwang et al. | |
| 2016/0323011 A1 | 11/2016 | Tang et al. | |
| 2017/0013641 A1 | 1/2017 | Patel et al. | |
| 2017/0135090 A1 | 5/2017 | Yin et al. | |
| 2017/0164350 A1 | 6/2017 | Sun et al. | |
| 2017/0180098 A1* | 6/2017 | You | H04L 5/0058 |
| 2018/0069660 A1 | 3/2018 | Yi et al. | |
| 2018/0077718 A1 | 3/2018 | Nory et al. | |
| 2018/0213530 A1 | 7/2018 | Mochizuki et al. | |
| 2019/0052421 A1 | 2/2019 | Yin et al. | |
| 2019/0059127 A1 | 2/2019 | Fan et al. | |
| 2019/0110312 A1 | 4/2019 | Patel et al. | |
| 2019/0312669 A1 | 10/2019 | Kwak et al. | |
| 2020/0014517 A1 | 1/2020 | Takeda et al. | |
| 2021/0058961 A1 | 2/2021 | Patel | |

FOREIGN PATENT DOCUMENTS

| | | |
|---|---|---|
| CN | 104620629 A | 5/2015 |
| JP | 2009212597 A | 9/2009 |
| JP | 2013541263 A | 11/2013 |
| JP | 2015521425 A | 7/2015 |
| JP | 2015159063 A | 9/2015 |
| JP | 2017533620 A | 11/2017 |
| JP | 2018520591 A | 7/2018 |
| KR | 20140119700 A | 10/2014 |
| TW | 201722108 A | 6/2017 |
| WO | WO-2009131337 A1 | 10/2009 |
| WO | WO-2012019538 A1 | 2/2012 |
| WO | WO-2012061257 A1 | 5/2012 |
| WO | WO-2012068141 A1 | 5/2012 |
| WO | WO-2014040531 A1 | 3/2014 |
| WO | WO2015041410 A | 3/2015 |
| WO | WO-2016114917 A1 | 7/2016 |
| WO | WO-2017007545 A1 | 1/2017 |
| WO | WO-2017026159 A1 | 2/2017 |
| WO | WO-2017095607 A1 | 6/2017 |

OTHER PUBLICATIONS

Lucent-A., et al., "Measurement and DRX Solution", 3GPP Draft; R2-115341 DRX Issue v0.1, 3rd Generation Partnership Project (3GPP), Mobile Competence Centre; 650, Route Des Lucioles; F-06921 Sophia-Antipolis Cedex; France, vol. RAN WG2, No. Zhuhai; Oct. 10, 2011, Oct. 3, 2011 (Oct. 3, 2011), XP050540865, [retrieved on Oct. 3, 2011].
International Search Report and Written Opinion—PCT/US2016/035171—ISA/EPO—dated Aug. 4, 2016.
Intel Corporation: "Subframe Structure for NR Dynamic TDD," 3GPP TSG RAN1 WG Meeting #87, 3GPP Draft; R1-1612005, Subframe Structure for NR Dynamic TDD, 3rd Generation Partnership Project (3GPP), Mobile Competence Centre; 650, Route Des Lucioles; F-06921 Sophia-Antipolis Cedex; France, vol. RAN WG1, No. Reno, Nevada, USA; Nov. 14, 2016-Nov. 18, 2016, Nov. 13, 2016 (Nov. 13, 2016), XP051175969, 8 Pages, Retrieved from the Internet: URL: http://www.3gpp.org/ftp/Meetings_3GPP_SYNC/RAN1/Docs/ [retrieved on Nov. 13, 2016], figure 8, section 3.2.
Mediatek Inc: "Performance Evaluation on Channel Structure of Short PUCCH for 1 or 2 Bits Uci", 3GPP Draft, 3GPP TSG RAN WG1 Meeting #89, R1-1707842_Performance Evaluation on Channel Structure of Short PUCCH for 1 or 2 Bits UCI, 3rd Generation Partnership Project (3GPP), Mobile Competence Centre, 650, Route Des Lucioles, F-06921 Sophia-Antipolis Cedex, France, vol. RAN WG1, No. Hangzhou; May 15, 2017-May 19, 2017, (May 14, 2017) May 14, 2017, XP051273043, 6 Pages, Retrieved from the Internet: URL: http://www.3gpp.org/ftp/Meetings_3GPP_SYNC/RAN1/Docs/ [retrieved on May 13, 2017], figure 2, table 2, sections 3 and 4.
Li X., et al., "Research on PUCCH Multi-User Receiving Algorithm in LTE-A", Television Technology, Network & Convergence, Video Engineering, 2017, No. 2, CLC No. TP393.1, Feb. 17, 2017, 12 Pages, DOI: 10.16280/jvideoe.2017.02.008.

* cited by examiner

Incoherent SR/CSI

LOW LATENCY PHYSICAL UPLINK CONTROL CHANNEL WITH SCHEDULING REQUEST AND CHANNEL STATE INFORMATION

CROSS REFERENCES

The present Application for Patent is a divisional of U.S. patent application Ser. No. 15/169,420 entitled "Low Latency Physical Uplink Control Channel with Scheduling Request and Channel State Information" filed May 31, 2016, which claims priority to U.S. Provisional Patent Application No. 62/190,506 entitled "Low Latency Physical Uplink Control Channel with Scheduling Request and Channel State Information," filed Jul. 9, 2015, assigned to the assignee hereof.

BACKGROUND

The following relates generally to wireless communication, and more specifically to low latency physical uplink control channel (PUCCH) with scheduling requests (SR) and channel state information (CSI).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology. A wireless multiple-access communications system (including an LTE system) may include a number of base stations, each supporting communication for multiple communication devices, which may otherwise be known as user equipment (UE).

In some cases, a base station may transmit reference signals to a UE to aid in evaluating channel conditions. The UE may then send channel state information (CSI) reports to the base station periodically or when initiated by the base station. Periodic and base station-initiated CSI reports may be sufficient to determine current channel conditions. If the system supports low latency communications, however, the periodic and base station-initiated reports may be insufficient. This may result in dropped packets and delayed communications.

SUMMARY

To facilitate efficient low latency communication between a user equipment (UE) and a base station, the UE may send UE-initiated channel state information (CSI) reports, which may be in addition to periodic and base station-triggered reports. For example, the UE may send UE-initiated CSI reports using contention-based spectrum, using a request-to-transmit, using a CSI differential (i.e., an indicator of a change in channel conditions), and the like. In some cases, the base station may schedule different UEs for uplink low latency communication by providing resources to each UE for CSI and scheduling requests (SRs) using coherent or non-coherent uplink transmissions. The CSI and SR may be combined with uplink feedback, including, for instance, hybrid automatic repeat request (HARQ) feedback. The uplink resources for UE-initiated CSI reporting may include and may be selected from different time resources, subcarriers, or different cyclic shifts of a predetermined sequence.

A method of wireless communication is described. The method may include determining CSI for a communication link that uses a first TTI duration in a system that supports operation with the first TTI duration and a second TTI duration that is greater than the first TTI duration. The method may also include identifying resources of an unscheduled uplink channel on which to transmit a report with the determined CSI and transmitting the report on the identified resources.

An apparatus for wireless communication is described. The apparatus may include means for determining CSI for a communication link that uses a first TTI duration in a system that supports operation with the first TTI duration and a second TTI duration that is greater than the first TTI duration. The apparatus may also include means for identifying resources of an unscheduled uplink channel on which to transmit a report with the determined CSI and means for transmitting the report on the identified resources.

A further apparatus for wireless communication is described. The apparatus may include a processor, memory in electronic communication with the processor, and instructions stored in the memory. The instructions may be operable, when executed by the processor, to cause the apparatus to determine CSI for a communication link that uses a first TTI duration in a system that supports operation with the first TTI duration and a second TTI duration that is greater than the first TTI duration, identify resources of an unscheduled uplink channel on which to transmit a report with the determined CSI, and transmit the report on the identified resources.

A non-transitory computer-readable medium storing code for wireless communication is described. The code may include instructions executable to determine CSI for a communication link that uses a first TTI duration in a system that supports operation with the first TTI duration and a second TTI duration that is greater than the first TTI duration, identify resources of an unscheduled uplink channel on which to transmit a report with the determined CSI, and transmit the report on the identified resources.

Some examples of the method, apparatus, or non-transitory computer-readable media described above may include features, steps, means, or instructions for selecting the resources from a set of resources reserved for uplink control information (UCI). Some examples may include receiving signaling that indicates the set of resources reserved for UCI. In some examples, the signaling is or includes a downlink grant.

In some examples of the method, apparatus, or non-transitory computer-readable media described above, the set of resources reserved for UCI includes resources reserved for a scheduling request (SR), a CSI report, or hybrid automatic repeat request (HARQ) feedback, or any combination thereof. In some examples, the set of resources reserved for UCI is or includes a set of resource blocks of a TTI having the first TTI duration. Additionally or alternatively, the set of resources reserved for UCI may be based at least in part on a number of user equipment (UEs) for which the set of resources reserved for UCI is allocated, and the number of UEs may include coherent users or non-coherent users, or both.

Some examples of the method, apparatus, or non-transitory computer-readable media described above may include features, steps, means, or instructions for determining that a TTI having the first TTI duration is available for CSI reporting. In some examples, the report is transmitted with a different cyclic shift from an uplink reference signal.

Another method of wireless communication is described. The method may include determining CSI for a communication link that uses a first TTI duration in a system that supports operation with the first TTI duration and a second TTI duration that is greater than the first TTI duration. The method may also include transmitting a request for resources on which to send a report with the determined CSI and receiving a grant for uplink resources for the report in response to the request, and transmitting the report using the uplink resources.

Another apparatus for wireless communication is described. The apparatus may include means for determining CSI for a communication link that uses a first TTI duration in a system that supports operation with the first TTI duration and a second TTI duration that is greater than the first TTI duration. The apparatus may also include means for transmitting a request for resources on which to send a report with the determined CSI, means for receiving a grant for uplink resources for the report in response to the request, and means for transmitting the report using the uplink resources.

A further apparatus for wireless communication is described. The apparatus may include a processor, memory in electronic communication with the processor, and instructions stored in the memory. The instructions may be operable, when executed by the processor, to cause the apparatus to determine CSI for a communication link that uses a first TTI duration in a system that supports operation with the first TTI duration and a second TTI duration that is greater than the first TTI duration, transmit a request for resources on which to send a report with the determined CSI, receive a grant for uplink resources for the report in response to the request, and transmit the report using the uplink resources.

Another non-transitory computer-readable medium storing code for wireless communication is described. The code may include instructions executable to determine CSI for a communication link that uses a first TTI duration in a system that supports operation with the first TTI duration and a second TTI duration that is greater than the first TTI duration, transmit a request for resources on which to send a report with the determined CSI, receive a grant for uplink resources for the report in response to the request, and transmit the report using the uplink resources.

Another method of wireless communication is described. The method may include transmitting a report with CSI for a communication link that uses a first TTI duration in a system that supports operation with the first TTI duration and a second TTI duration that is greater than the first TTI duration. The method may also include determining a change in a channel state for the communication link and transmitting signaling that indicates a difference between the reported CSI and the change in the channel state.

A further apparatus for wireless communication is described. The apparatus may include means for transmitting a report with CSI for a communication link that uses a first TTI duration in a system that supports operation with the first TTI duration and a second TTI duration that is greater than the first. The apparatus may also include means for determining a change in a channel state for the communication link and means for transmitting signaling that indicates a difference between the reported CSI and the change in the channel state.

A further apparatus for wireless communication is described. The apparatus may include a processor, memory in electronic communication with the processor, and instructions stored in the memory. The instructions may be operable, when executed by the processor, to cause the apparatus to transmit a report with CSI for a communication link that uses a first TTI duration in a system that supports operation with the first TTI duration and a second TTI duration that is greater than the first, determine a change in a channel state for the communication link, and transmit signaling that indicates a difference between the reported CSI and the change in the channel state.

Another non-transitory computer-readable medium storing code for wireless communication is described. The code may include instructions executable to transmit a report with CSI for a communication link that uses a first TTI duration in a system that supports operation with the first TTI duration and a second TTI duration that is greater than the first TTI duration, determine a change in a channel state for the communication link, and transmit signaling that indicates a difference between the reported CSI and the change in the channel state.

In some examples of the method, apparatus, or non-transitory computer-readable media described above, the report with the CSI or the signaling that indicates the difference between the CSI and the change in the channel state is transmitted on resources selected from a set of resources reserved for uplink control information (UCI). In some examples, the set of resources reserved for UCI includes resources reserved for scheduling request (SR), CSI reports, hybrid automatic repeat request (HARQ) feedback, or any combination thereof. Additionally or alternatively, the set of resources reserved for UCI may be reserved based at least in part on a number of user equipment (UEs) for which the set of resources reserved for UCI is allocated, and the number of UEs comprises coherent users or non-coherent users, or both.

Some examples of the method, apparatus, or non-transitory computer-readable media described above may include features, steps, means, or instructions for receiving a grant for resources on which to send the report with the CSI or the signaling that indicates the difference between the CSI and the change in the channel state in a downlink data channel. In some examples, the report with the CSI or the signaling that indicates the difference between the CSI and the change in the channel state is transmitted with a different cyclic shift from an uplink reference signal.

A method of wireless communication is described. The method may include determining a set of resources reserved for UCI. The method may also include receiving at least one of a report with CSI, a request for resources on which to send a CSI report, or signaling that indicates a change in CSI on resources of the set of reserved resources from a UE, the communicating using a first TTI duration in a system that supports operation with the first TTI duration and a second TTI duration that is greater than the first.

An apparatus for wireless communication is described. The apparatus may include means for determining a set of resources reserved for UCI. The apparatus may also include means for receiving at least one of a report with CSI, a request for resources on which to send a CSI report, or signaling that indicates a change in CSI on resources of the set of reserved resources from a UE, the communicating using a first TTI duration in a system that supports operation with the first TTI duration and a second TTI duration that is greater than the first.

A further apparatus for wireless communication is described. The apparatus may include a processor, memory in electronic communication with the processor, and instructions stored in the memory and operable, when executed by the processor, to cause the apparatus to determine a set of resources reserved for UCI and receive at least one of a report with CSI, a request for resources on which to send a CSI report, or signaling that indicates a change in CSI on resources of the set of reserved resources from a UE, the communicating using a first TTI duration in a system that supports operation with the first TTI duration and a second TTI duration that is greater than the first.

A non-transitory computer-readable medium storing code for wireless communication is described. The code may include instructions executable to determine a set of resources reserved for UCI, and receive at least one of a report with CSI, a request for resources on which to send a CSI report, or signaling that indicates a change in CSI on resources of the set of reserved resources from a UE, the communicating using a first TTI duration in a system that supports operation with the first TTI duration and a second TTI duration that is greater than the first.

BRIEF DESCRIPTION OF THE DRAWINGS

Aspects of the disclosure are described in reference to the following figures.

DETAILED DESCRIPTION

Figure 1:
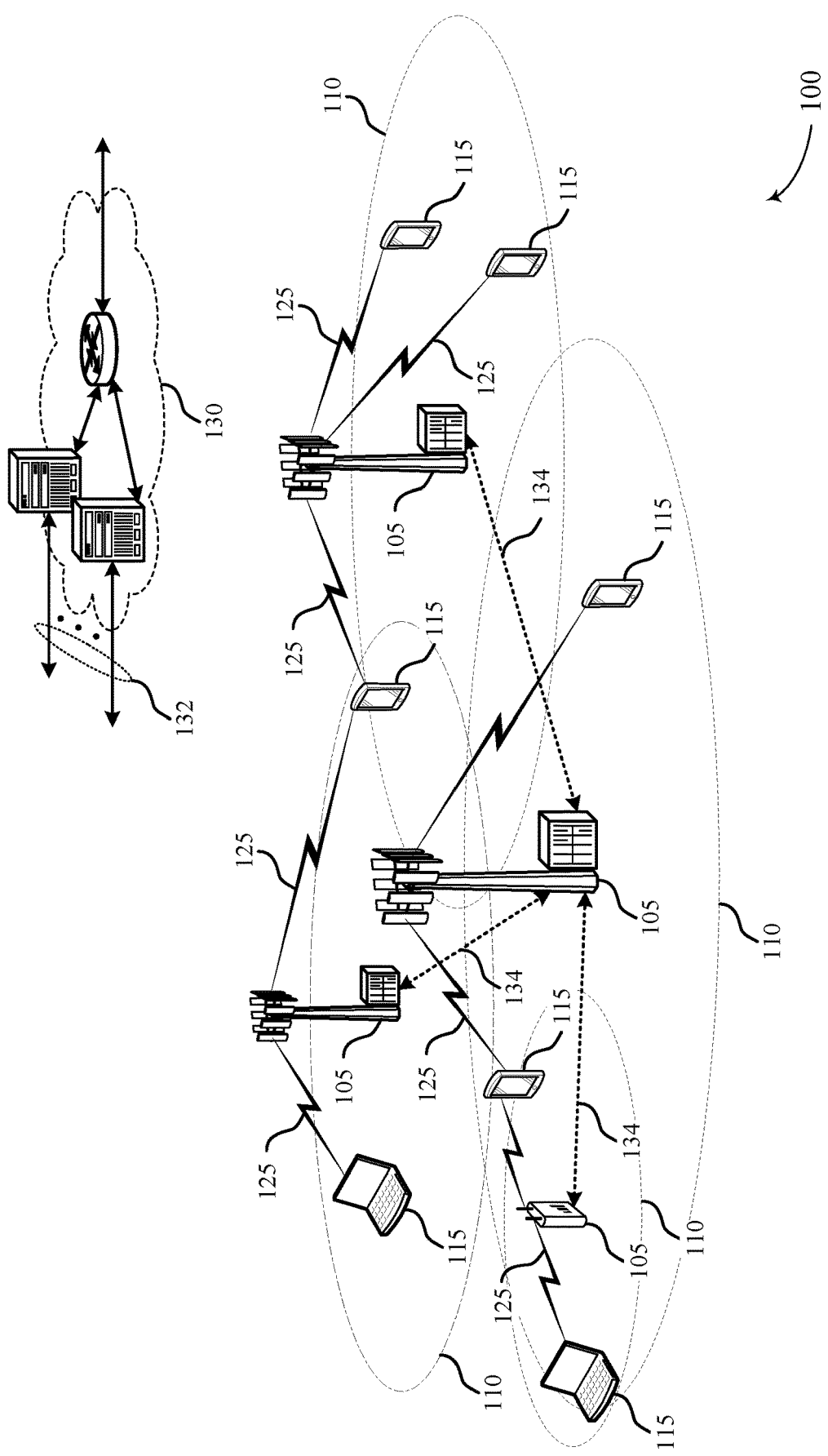
FIG. 1 illustrates an example of a wireless communications system that supports low latency physical uplink control channel (PUCCH) with scheduling request (SR) and channel state information (CSI) in accordance with various aspects of the present disclosure.

A wireless system may support both uplink and downlink transmissions between a user equipment (UE) and a base station. In some cases, both uplink and downlink transmissions may be based on low latency operations (e.g., operations where the basic time unit for scheduling is less than 1 ms). To facilitate efficient low latency communication, the timing for a channel state information (CSI) report to a base station may be initiated by a UE.

CSI may be determined by a UE based on reference signals transmitted by the base station. In addition to UE-initiated CSI reporting, CSI reports may be scheduled periodically or initiated by the base station. Latency tolerant traffic may be effectively communicated or monitored using periodic or base station-initiated reporting. For low latency operation, UE-initiated CSI reports may be used to ensure that transmissions are based on current CSI. UE-initiated CSI reports may be sent in several ways. For example, a UE may transmit CSI reports using contention-based uplink resources, or it may send a CSI Request-to-Transmit (e.g., a 1-bit indicator), or it may transmit a differential CSI (which also may be a 1-bit indicator). UEs may also transmit uplink control information that includes scheduling request (SR) messages, and feedback for downlink transmissions (e.g., acknowledgements (ACKs) or negative acknowledgements (NACKs)). In some cases, UE-initiated CSI reports may be combined with SR transmissions.

In some examples, a two symbol low latency transmission time interval (TTI) structure may be used, and low latency users may be assigned to an SR/CSI resource pool. Coherent or non-coherent transmission may be used. Pilot signals (for coherent transmissions), feedback and SR/CSI requests may be sent using separate cyclic shifts of a predetermined uplink sequence.

Some users may access a system or transmit initial uplink messages using longer TTIs—that is, some users send initial uplink transmissions that are not associated with low latency operation. So a user may use a physical random access channel (PRACH) to obtain a low latency uplink resource. The PRACH signature may be confined to a set of signatures that may be mapped to low latency SR/CSI requests. A base station may handle PRACH to obtain a low latency uplink resource in various ways. For example, the base station may grant one time access for SR/CSI requests through a PRACH response. Or the base station may set aside additional PUCCH resources. In some cases, the base station reassigns a user with resources previously assigned to another existing user. It is thus possible for the base station to indicate to the existing user a loss of resources and convey resources to the new user through a PRACH configuration.

Aspects of the disclosure introduced above are further described below in the context of a wireless communication system. Specific examples are then described for coherent and non-coherent SR/CSI reports, and alternatives for UE-initiated CSI reporting are discussed. These and other aspects of the disclosure are further illustrated by and described with reference to apparatus diagrams, system diagrams, and flowcharts that relate to low latency physical uplink control channel (PUCCH) with scheduling request (SR) and channel state information (CSI).

FIG. 1 illustrates an example of a wireless communications system 100 in accordance with various aspects of the present disclosure. The wireless communications system 100 includes base stations 105, user equipment (UEs) 115, and a core network 130. In some examples, the wireless communications system 100 may be a Long Term Evolution (LTE)/LTE-Advanced (LTE-A) network. Wireless communication may support low latency communications between a UE 115 and base station 105. This may include UE-initiated CSI reports.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105. As described herein, base stations 105 may receive CSI reports from UEs 115 on resources designated or reserved for uplink control information.

A frame structure may be used to organize physical resources. A frame may be a 10 ms interval that may be further divided into 10 equally sized sub-frames. Each sub-frame may include two consecutive time slots. Each slot may include 6 or 7 orthogonal frequency division multiple access (OFDMA) symbol periods. In some cases, a subframe may be the basic unit of scheduling, known as the transmission time interval (TTI). In other cases, such as with low latency operation, a different TTI may be used, such as a symbol period, a pair of symbol periods, or a slot. TTIs for low latency operation may thus have a numerology that is compatible with other LTE transmission structures and timing (e.g., subframe). The system 100 may concurrently support communication using TTIs over different duration (e.g., TTIs having a duration of a subframe and TTIs having a duration of a symbol period or a slot).

In some cases, wireless communications system 100 may utilize one or more enhanced component carriers (eCCs). An enhanced component carrier (eCC) may be characterized by one or more features including: flexible bandwidth, different TTIs, and modified control channel configuration. In some cases, an eCC may be associated with a carrier aggregation (CA) configuration or a dual connectivity configuration (e.g., when multiple serving cells have a suboptimal backhaul link). An eCC may also be configured for use in unlicensed spectrum or shared spectrum (e.g., where more than one operator is licensed to use the spectrum). An eCC characterized by flexible bandwidth may include one or more segments that may be utilized by UEs 115 that do are not capable of monitoring the whole bandwidth or prefer to use a limited bandwidth (e.g., to conserve power).

A resource element consists of one symbol period and one subcarrier (a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. Some resource elements may include downlink (DL) reference signals (DL-RS). The DL-RS may include a cell-specific reference signals (CRS) and a UE-specific RS (UE-RS), which may also be referred to as demodulation references signals (DMRS). UE-RS may be transmitted on the resource blocks associated with physical downlink shared channel (PDSCH). References signals may be employed as discussed below. The number of bits carried by each resource element may depend on the modulation scheme (the configuration of symbols that may be selected during each symbol period). Thus, the more resource blocks that a UE receives and the higher the modulation scheme, the higher the data rate may be.

PUCCH may be used for uplink (UL) acknowledgements (ACKs), scheduling requests (SRs) and channel quality indicators (CQI) and other UL control information. A PUCCH may be mapped to a control channel defined by a code and two consecutive resource blocks. UL control signaling may depend on the presence of timing synchronization for a cell. PUCCH resources for SR and CSI reporting may be assigned (and revoked) through RRC signaling. In some cases, resources for SR may be assigned after acquiring synchronization through a RACH procedure. In other cases, an SR may not be assigned to a UE 115 through the RACH (i.e., synchronized UEs may or may not have a dedicated SR channel). PUCCH resources for SR and CSI may be lost when the UE is no longer synchronized. In some cases, CSI may be periodic or triggered by the base station 105. In other cases, such as with low latency operation, CQI may be initiated by a UE 115.

A base station 105 may insert periodic pilot symbols such as CRS to aid UEs 115 in channel estimation and coherent demodulation. CRS may include one of 504 different cell identities. They may be modulated using quadrature phase shift keying (QPSK) and power boosted (e.g., transmitted at 6 dB higher than the surrounding data elements) to make them resilient to noise and interference. CRS may be embedded in 4 to 16 resource elements in each resource block based on the number of antenna ports or layers (up to 4) of the receiving UEs 115. In addition to CRS, which may be utilized by all UEs 115 in the geographic coverage area 110 of the base station 105, DMRS may be directed toward specific UEs 115 and may be transmitted on resource blocks assigned to those UEs 115. DMRS may include signals on 6 resource elements in each resource block in which they are transmitted. The DMRS for different antenna ports may each utilize the same 6 resource elements, and may be distinguished using different orthogonal cover codes (e.g., masking each signal with a different combination of 1 or −1 in different resource elements). In some cases, two sets of DMRS may be transmitted in adjoining resource elements. In some cases, additional reference signals known as channel state information reference signals (CSI-RS) may be included to aid in generating CSI. On the UL, a UE 115 may transmit a combination of periodic sounding reference signal (SRS) and UL DMRS for link adaptation and demodulation, respectively.

A base station 105 may gather CSI from a UE 115 in order to efficiently configure and schedule the channel. This information may be sent from the UE 115 in the form of a channel state report. A channel state report may contain a rank indicator (RI) requesting a number of layers to be used for DL transmissions (e.g., based on the antenna ports of the UE 115), a precoding matrix indicator (PMI) indicating a preference for which precoder matrix should be used (based on the number of layers), and a CQI representing the highest modulation and coding scheme (MCS) that may be used. CQI may be calculated by a UE 115 after receiving predetermined pilot symbols such as CRS or CSI-RS. RI and PMI may be excluded if the UE 115 does not support spatial multiplexing (or is not in support spatial mode). The type of information included in the report determines a reporting type. CSI reports may be periodic or aperiodic. That is, a base station 105 may configure a UE 115 to send periodic reports at regular intervals, and may also request additional reports as needed. Aperiodic reports may include wideband reports indicating the channel quality across an entire cell bandwidth, UE selected reports indicating a subset of the best subbands, or configured reports in which the subbands reported are selected by the base station 105. In some cases, such as with low latency operation, the UE 115 may also send reports of updates based on changing channel conditions. These reports may be referred to as UE-initiated CSI reports.

A UE 115 may transmit a RACH preamble to a base station 105 to establish a new connection or to initiate low latency communications. This may be known as RACH message 1. For example, the RACH preamble may be randomly selected from a set of 64 predetermined sequences. This may enable the base station 105 to distinguish between multiple UEs 115 trying to access the system simultaneously. The base station 105 may respond with a random access response (RAR), or RACH message 2, that provides an uplink (UL) resource grant, a timing advance, and a temporary cell radio network temporary identity (C-RNTI). The UE 115 may then transmit a radio resource control (RRC) connection request, or RACH message 3, along with a temporary mobile subscriber identity (TMSI) (if the UE 115 has previously been connected to the same wireless network) or a random identifier. The RRC connection request may also indicate the reason the UE 115 is connecting to the network (e.g., emergency, signaling, data exchange, etc.). The base station 105 may respond to the connection request with a contention resolution message, or RACH message 4, addressed to the UE 115, which may provide a new cell radio network temporary identity (C-RNTI). If the UE 115 receives a contention resolution message with the correct identification, it may proceed with RRC setup. If the UE 115 does not receive a contention resolution message (e.g., if there is a conflict with another UE 115) it may repeat the RACH process by transmitting a new RACH preamble.

A UE 115 and a base station 105 may use low latency communications to improve the throughput of a wireless link. To facilitate efficient low latency communication the UE 115 may send UE-initiated CSI reports, which may be in addition to periodic and base station triggered reports. For example, the UE 115 may send UE-initiated CSI reports using contention based spectrum, using a request-to-transmit, or using a CSI differential (i.e., an indicator of a change in channel conditions). The base station 105 may schedule different UEs 115 for uplink low latency communication by providing resources to each UE 115 for CSI and SRs using coherent or non-coherent uplink transmissions. The CSI and SR may also be combined with uplink feedback based on downlink transmissions. The uplink resources may be based on different time resources, subcarriers, or different cyclic shifts of a predetermined sequence.

Figure 2:
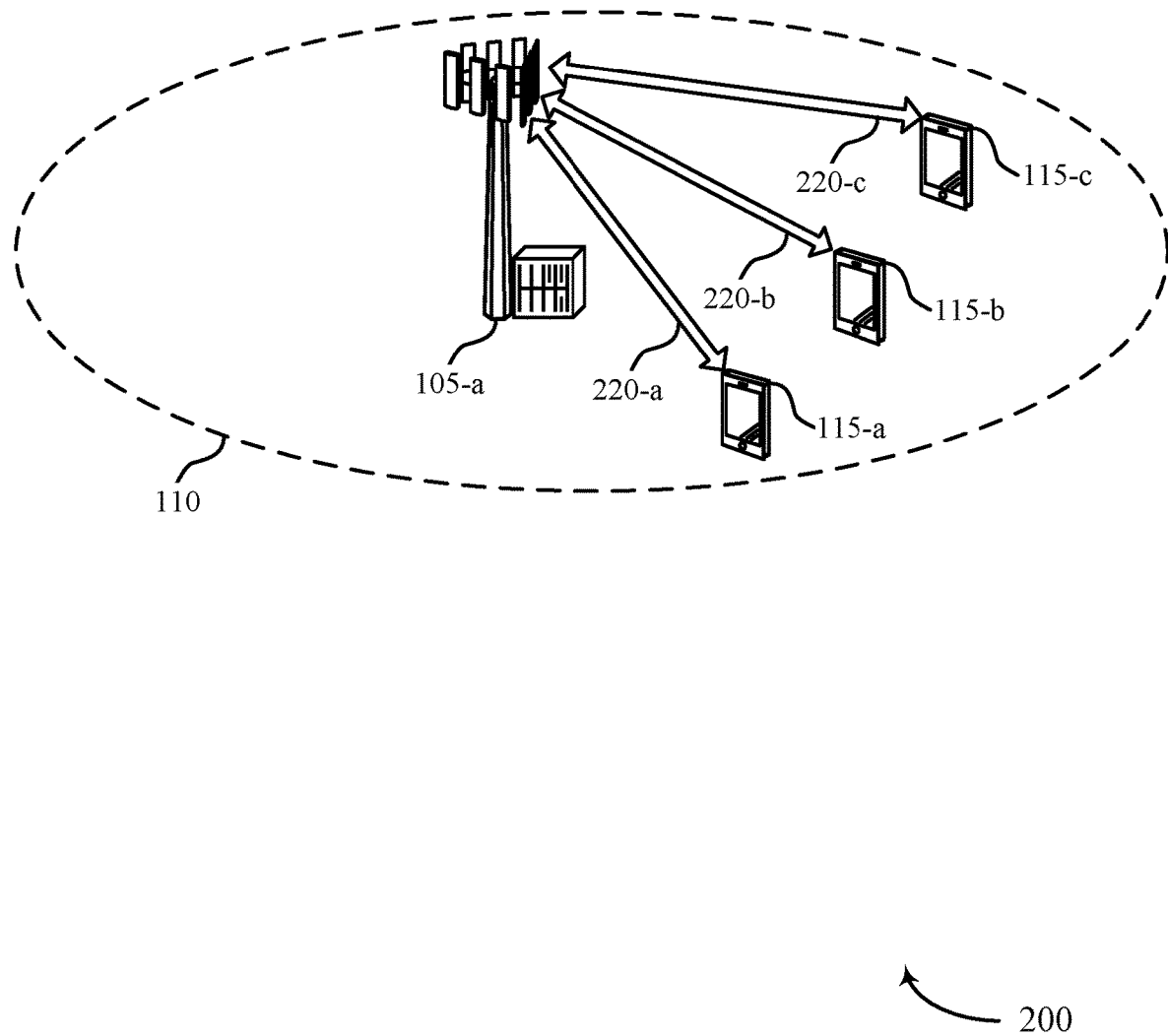
FIG. 2 illustrates an example of a wireless communications system that supports low latency PUCCH with SR and CSI in accordance with various aspects of the present disclosure.

FIG. 2 illustrates an example of a wireless communications system 200 for low latency PUCCH with SR and CSI in accordance with various aspects of the present disclosure. Wireless communications system 200 may include UEs 115-a, 115-b, 115-c and base station 105-a, which may be examples of a UE 115 base station 105 described with reference to FIG. 1. Wireless communications system 200 may support both uplink and downlink transmissions between UEs 115-a, 115-b, 115-c and base station 105-a. Transmissions in each direction may be either data or control messages. Uplink control information may include CQI, SR messages, and feedback for downlink transmissions (e.g., AKCs or NACKs). In some cases, both uplink and downlink transmissions may be based on low latency operations (e.g., operations where the basic time unit for scheduling is less than 1 ms).

CQI may reflect CSI determined by UE 115-a (or another UE 115) based on reference signals transmitted by base station 105-a. CQI may be scheduled periodically, or initiated by base station 105-a. For low latency operation, UE-initiated CSI reports may also be used to ensure that transmissions are based on current CSI. UE-initiated CSI reports may be sent in several ways. For example, a UE 115-a may transmit CSI reports based on contention based uplink resources, it may send a CSI request-to-transmit (e.g., a 1-bit indicator), or it may transmit a differential CSI (which also may be a 1-bit indicator). In some cases, UE-initiated CSI reports may be combined with SR transmissions.

In some examples, CSI reports may be allocated through contention-based uplink resources. So resource elements may be pre-allocated for control information transmission. Users that attempt to transmit may randomly choose uplink resources to send control information. Although, in some cases, contention-based schemes with large payload sizes may be costly due to either over-allocation of resources or latency penalties created by collisions.

In other examples, a one bit CSI request-to-transmit message or indication may be sent from UE 115-a to base station 105-a on an uplink transmission. Upon receiving the request, base station 105-a may transmit a downlink grant to specify a CSI trigger with pre-allocated uplink resources. The base station 105-a may additionally couple uplink CSI transmissions with uplink group ACK and a CRC. The one bit transmission may be pre-allocated for a given low latency user.

In other examples, UE 115-a may generate a one bit differential CSI for transmission to base station 105-a. For instance, UE 115-a may send a full CSI report either through a periodic CSI allocation or an aperiodic allocation started by a trigger from the base station 105-a. UE 115-a may send a differential CSI value that accumulates on top of the full CSI report. The one bit transmission may be pre-allocated for a given low latency user.

In some systems, including system 200 in some case, a two symbol low latency TTI structure may be used, and low latency users may be assigned in the SR/CSI resource pool. In one case, a coherent transmission may be used. The coherent transmission may allow three users per one half RB. A pilot signal and a SR/CSI request may be sent on two separate cyclic shifts. This may use the same structure as the previously defined coherent ACK structure. Or a non-coherent transmission may be used. For example, the non-coherent transmission may enable six users per one half RB. The SR/CSI request may thus be sent on a single cyclic shift. In any case, capacity may be further improved if the SR/CSI resource pool is shared with ACK users or if users are assigned in both symbols of both RBs. Base station 105-a may predefine per user which TTIs are assigned as an SR or as a CSI req. Thus, base station 105-a may multiplex uplink transmissions from UEs 115-a, 115-b, 115-c.

In some examples, a two symbol low latency TTI structure may be used, and ACK/NACK resource pools may additionally be modified to include SR/CSI. Users who are scheduled a low latency physical downlink shared channel (uPDSCH) assignment in downlink may be assigned an uplink ACK physical uplink control channel (PUCCH) resource. On a frequency hopped symbol, users may use three cyclic shifts per RB. Pilot symbols may be coherently sent with ACK resources and SR/CSI request resources on each of three cyclic shifts. Base station 105-a may predefine for each user which TTIs are assigned as RS requests or CSI requests.

The user capacity for a two symbol low latency TTI structure may be determined based on a number of RBs. For example, for N RBs, a total of 2N symbol resources may be available. In this example, Y symbol resources may be used as ACK resources for 2Y users. If coherent transmission is used, 2N−Y symbol resources may be used for SR/CSI request resources for 3·(2N−Y) users. If non-coherent transmission is used, 2N−Y symbols may be used as SR/CSI request resources for 6·(2N−Y) users. Coherent and non-coherent users may be combined in the same RB. To support even more users, users can be assigned to SR/CSI resources with a specific periodicity, but this may lead to increased latency.

Some users may not, due to system constraints, operating conditions, or user preference, utilize low latency access to the uplink. So, as mentioned above, a user may use RACH to obtain a low latency uplink resource. The RACH signature may be confined to a set of signatures that may be mapped to low latency SR/CSI requests. Base station 105-a may handle using RACH to obtain a low latency uplink resource in many ways. For example, base station 105-a may grant one time access for SR/CSI requests through a RACH response. Base station 105-a may set aside additional PUCCH resources. In other examples, base station 105-a may swap the user with an existing user. Base station 105-a may thus indicate to the existing user a loss of resources and convey resources to the new user through a RACH configuration.

Figure 3A:
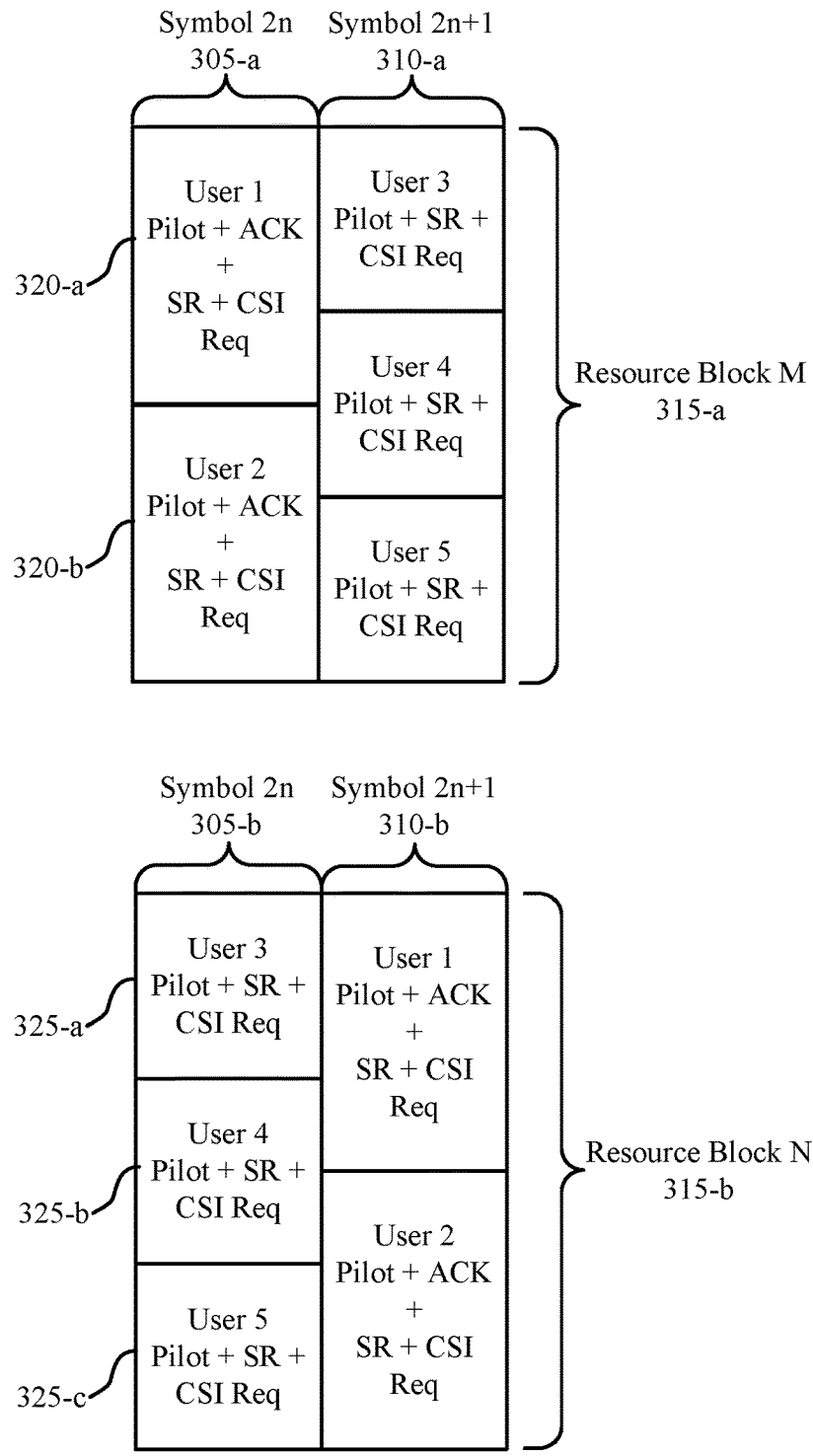
FIGS. 3A and 3B illustrate examples of coherent SR/CSI scheduling and non-coherent SR/CSI scheduling within a system that supports low latency PUCCH with SR and CSI in accordance with various aspects of the present disclosure.
Figure 3B:
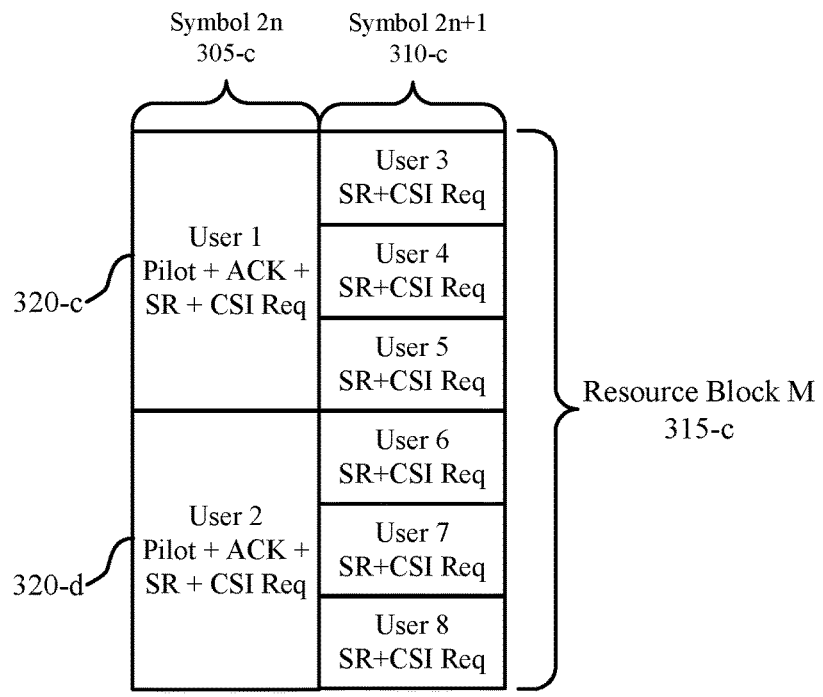

FIGS. 3A and 3B illustrates an example coherent SR/CSI scheduling configuration 301 and non-coherent SR/CSI scheduling configuration 302 for low latency PUCCH with SR and CSI in accordance with various aspects of the present disclosure. Coherent SR/CSI scheduling configuration 301 and non-coherent SR/CSI scheduling configuration 302 may be utilized by UEs 115 and base stations 105 described with reference to FIGS. 1-2. Coherent SR/CSI scheduling configuration 301 and non-coherent SR/CSI scheduling configuration 302 may represent an example based on a two-symbol TTI with frequency hopping; similar scheduling techniques may be used for systems with different configuration (e.g., with other TTI lengths).

Symbols 305-b and 310-a of coherent SR/CSI scheduling configuration 301 may include coherent transmissions, including a pilot symbol, a SR, and a CSI request for three different users. That is, the uplink resources for each user may occupy 4 out of 12 resource units. Symbols 305-b and 310-a may be utilized by the same users and transmitted at a different time. Symbol 305-b may be, for example, symbol 2n in a sequence of symbols. Symbol 310-a may be transmitted in a different frequency as symbol 305-b and may temporally follow symbol 305-b, i.e., symbol 2n+1. Symbols 305-b and 310-a may be coherent due to transmitting a pilot symbol alongside an SR and CSI request.

Symbols 305-a and 310-b (and similarly, symbols 305-c and 310-d) may be scheduled together based on transmissions including a pilot symbol, an ACK, a SR, and a CSI request for two users. That is, the subcarriers of resource blocks 315 and the cyclic shifts of a predetermined signal may represent a resource pool of 12 units. An uplink transmission including a pilot symbol, an ACK, a SR, and a CSI request may use 6 units, so each symbol may accommodate 2 users. Symbol 305-a may be, for example, symbol 2n in a sequence of symbols. Symbol 310-b may be transmitted in a different frequency as symbol 305-a and may temporally follow symbol 305-a, i.e., symbol 2n+1.

Symbols 305-d and 310-c of non-coherent SR/CSI scheduling configuration 302 may include non-coherent uplink SR/CSI transmissions for 6 different users (i.e., SR/CSI transmissions that are not accompanied by a pilot signal). Each non-coherent SR/CSI transmission may utilize 2 resource units per resource block 315. Thus, 6 users may be simultaneously multiplexed. Symbol 305-d may represent a first symbol period on a first resource block at symbol 2n and symbol 310-c may represent a subsequent symbol 2n+1 on a different resource block 315 based on a frequency hopping configuration.

Resource blocks 315-a and 315-b may be paired frequency regions (e.g., based on a frequency hopping configuration) used to schedule uplink information regarding multiple users, including pilot signals, ACKs, SRs, and CSI requests. Resource Block 315-a may be at a higher frequency than resource block 315-b. The information transmitted by users in resource block 315-a during symbol 305-a (or 305-c) may be subsequently transmitted during symbol 310-b (or 310-d) using resource block 315-b after transmitting, and the information in resource block 315-b may hop frequencies to the frequency of resource block 315-a.

Transmissions 320-a, 320-b, 320-c, and 320-d may represent coherent transmissions including a pilot symbol, an ACK, a SR, and a CSI request. Transmissions 320-a, 320-b, 320-c, and 320-d may each include information from different UEs 115. Transmission 325-a, 325-b, and 325-c may be transmissions including a pilot symbol, a SR, and a CSI request. Transmissions 325-a, 325-b, and 325-c may be coherent, as they include a pilot signal along the SR and CSI request. These transmissions may include information for different users, and each of them may be sent in the same resource block 315-b.

Transmissions 330-a, 330-b, 330-c, 330-d, 330-e, and 330-f may be transmissions including, for example, a SR and a CSI request. These transmissions may be non-coherent, as they may not include a pilot signal along the SR and CSI request. These transmissions may include information for different users, but each of them may be sent in the same resource block 315-d. Similar to how symbols 305-a and 305-b would hop frequencies to become symbols 310-a and 310-b respectively, transmissions in resource block 315-d may hop frequencies to the frequency of 315-c and vice versa for a temporally following transmission.

Figure 4:
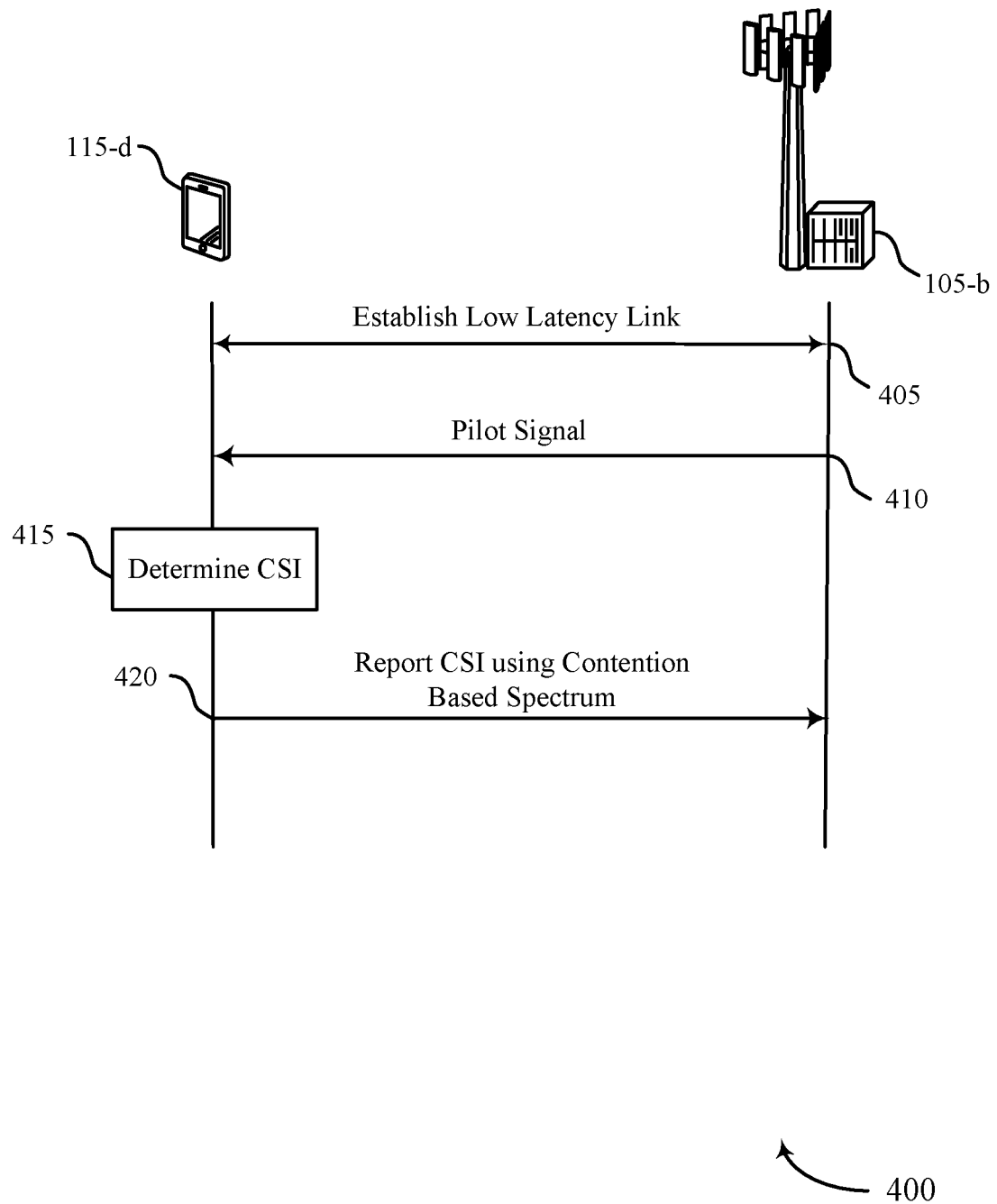
FIGS. 4-6 depict process flow diagrams that illustrate communication within a system that supports low latency PUCCH with SR and CSI in accordance with various aspects of the present disclosure.

FIG. 4 illustrates an example of a process flow 400 in a system that supports low latency PUCCH with SR and CSI in accordance with various aspects of the present disclosure. Process flow 400 may include a UE 115-d and base station 105-*b*, which may be examples of a UE 115 and base station 105 described with reference to FIGS. 1-2. Each of these components may be in communication with one another through a low latency wireless system. Process flow 400 may represent a method of transmitting a UE-initiated CSI report using contention based (or unscheduled) resources.

In some cases a UE 115-*a* and base station 105 may operate in a shared or unlicensed frequency spectrum. These devices may perform a clear channel assessment (CCA) prior to communicating in order to determine whether the channel is available. A CCA may include an energy detection procedure to determine whether there are any other active transmissions. For example, the device may infer that a change in a signal strength of a power meter indicates that a channel is occupied. Specifically, signal power is that is concentrated in a certain bandwidth and exceeds a predetermined noise floor may indicate another wireless transmitter. A CCA may also include detection of specific sequences that indicate use of the channel. For example, another device may transmit a specific preamble prior to transmitting a data sequence.

At step 405, UE 115-*d* and base station 105-*b* may establish a low latency link between one another. This communication link may use a first TTI duration in a system that supports operation with the first TTI duration and a second TTI duration that is greater than the first. For example, the first TTI duration may be the duration of one LTE symbol period, the duration of two LTE symbol periods, or the duration of one LTE slot, in various examples.

At step 410, base station 105-*b* may send a pilot signal to UE 115-*d*. The pilot signal may be a known data pattern that is processed in a known manner to both base station 105-*b* and UE 115-*d*. UE 115-*d* may use the pilot signal as a reference, for example, for calculating the channel response.

At step 415, UE 115-*d* may determine the CSI for the connection between the UE 115-*d* and the base station 105-*b*. UE 115-*d* may use the previously received pilot signal as a reference for calculating the CSI. The CSI may be used by the base station 105-*b* as an indicator for channel correction in the case of a noisy or poor signal.

At step 420, UE 115-*d* may transmit the CSI report to base station 105-*b* using a contention based resource. For example, UE 115-*d* may transmit a UE-initiated CSI report to base station 105-*b* using shared or unlicensed spectrum (in some cases, these reports may be sent as a supplement to periodic reports sent using licensed spectrum). If the channel on which UE 115-*d* intends to transmit is being used, UE 115-*d* may be delayed from transmission according to a clear channel assessment procedure.

Figure 5:
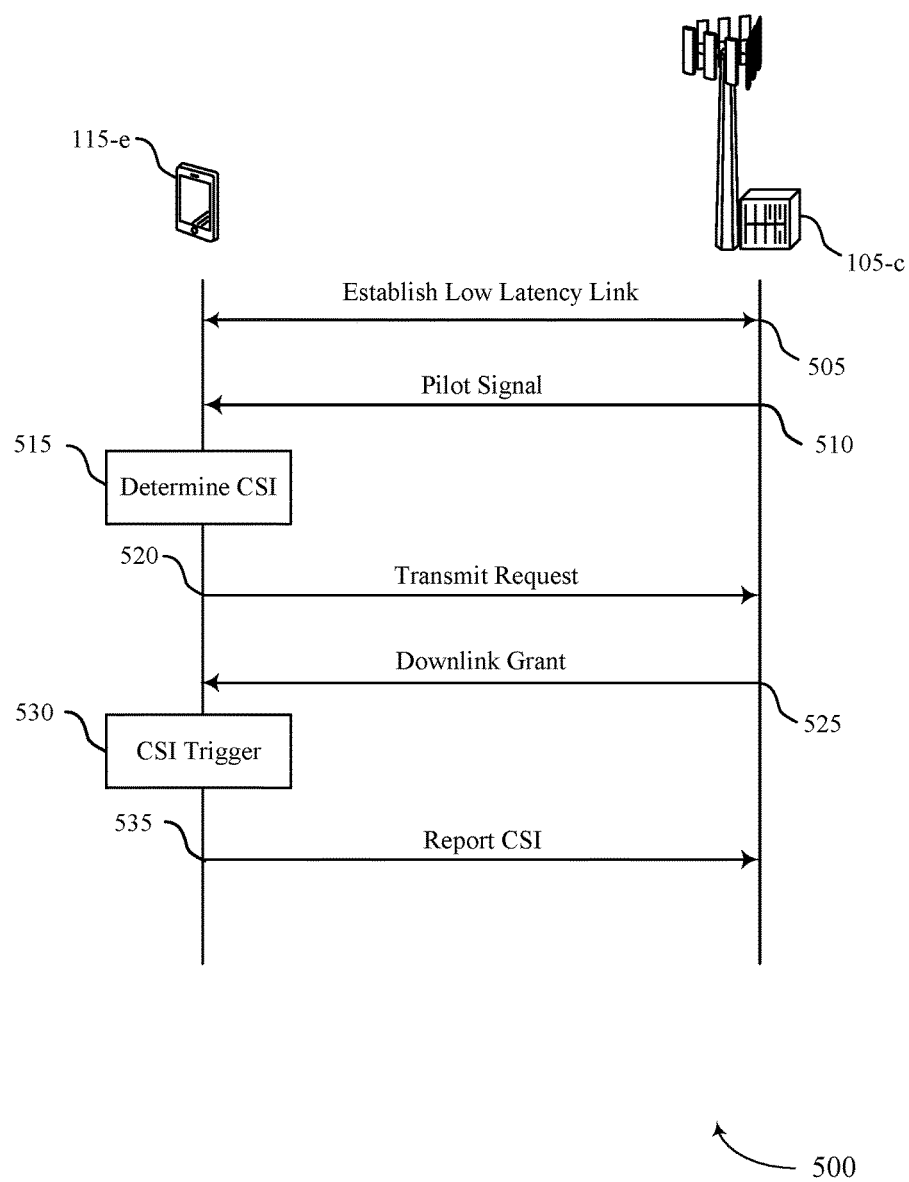

FIG. 5 illustrates an example of a process flow 500 in a system that supports low latency PUCCH with SR and CSI in accordance with various aspects of the present disclosure. Process flow 500 may include a UE 115-*e* and base station 105-*c*, which may be examples of a UE 115 and base station 105 described with reference to FIGS. 1-2. Each of these components may be in communication with one another in through a low latency wireless system. Process flow 500 may represent a method for transmitting a UE-initiated CSI report using a CSI transmission request.

At step 505, UE 115-*e* and base station 105-*c* may establish a low latency link between one another. This communication link may use a first TTI duration in a system that supports operation with the first TTI duration and a second TTI duration that is greater than the first. After establishing the low latency link, base station 105-*c* may send a pilot signal to UE 115-*e* at step 510. The pilot signal may be a known data pattern that is processed in a known manner to both base station 105-*c* and UE 115-*e*. UE 115-*e* may use the pilot signal as a reference, for example, for calculating the channel response.

Figure 3B:
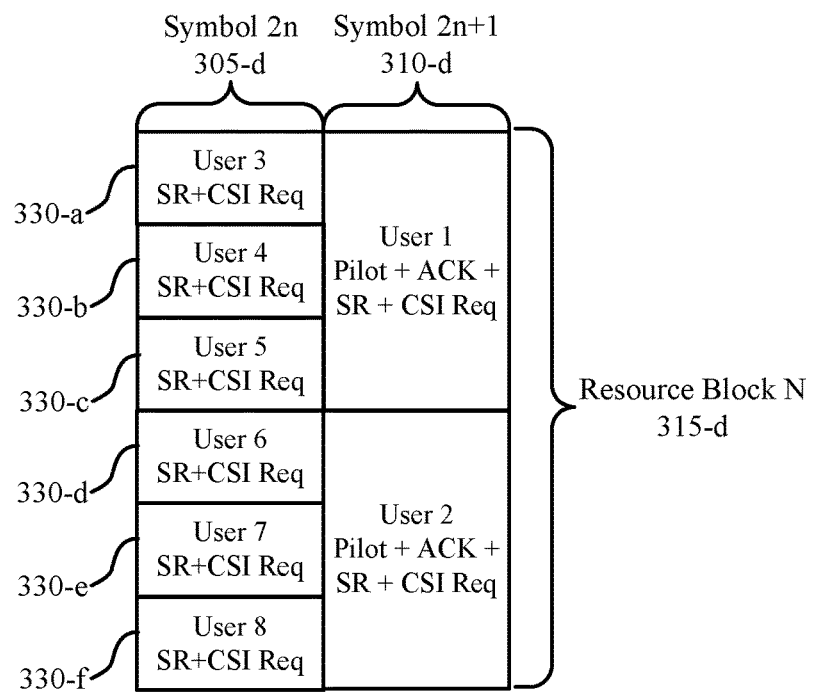

At step 515, UE 115-*e* may determine the CSI for the connection between the UE 115-*e* and the base station 105-*c*. UE 115-*e* may use the previously received pilot signal as a reference for calculating the CSI. The CSI may be used by the base station 105-*c* as an indicator for channel correction in the case of noisy or poor signal. At step 520, UE 115-*e* may send an uplink transmit request to base station 105-*c*. The uplink transmit request may be sent asking permission for the UE 115-*e* to send, for example, the CSI determined in step 515 using the pilot signal transmitted in step 510. In some cases the transmit request may be a 1-bit indicator included in an uplink transmission as described herein (e.g., using a multiplexing configuration described with reference to FIG. 3).

At step 525, base station 105-*c* may send a downlink grant to UE 115-*e*. The downlink grant may be in response to, for example, the transmit request sent in step 520. The downlink grant may give UE 115-*e* permission to send, for example, the CSI report determined in step 515. In some cases, the downlink grant may include a trigger for sending a CSI report.

At step 530, UE 115-*e* may identify a trigger for sending a CSI report. This may lead to UE 115-*e* transmitting the CSI report determined in step 515 to base station 105-*c*. This may happen as a result of receiving the downlink grant received by UE 115-*e* in step 525. Then, at step 535, UE 115-*e* may transmit a CSI report to base station 105-*c*.

Figure 6:
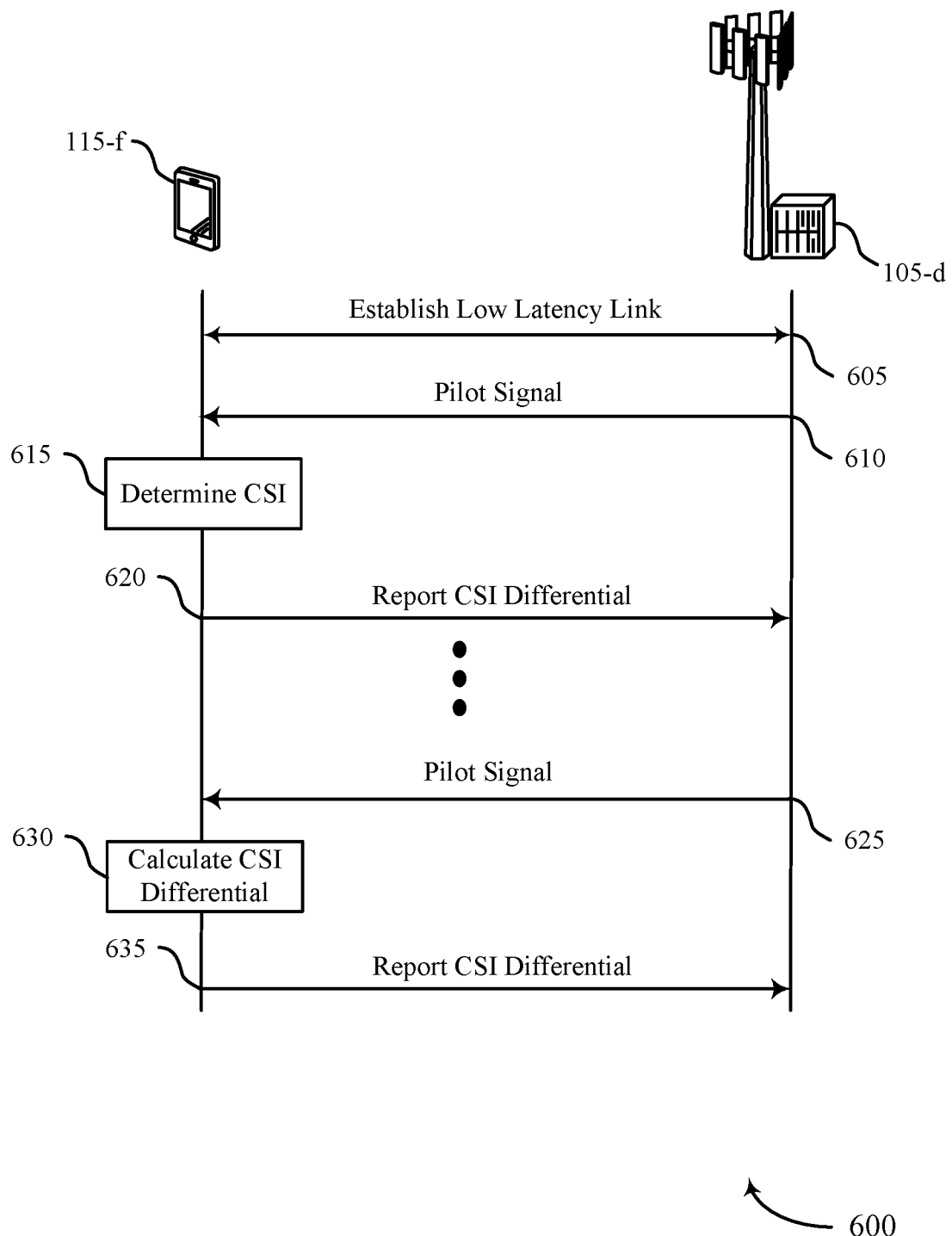

FIG. 6 illustrates an example of a process flow 600 for low latency PUCCH with SR and CSI in accordance with various aspects of the present disclosure. Process flow 600 may include a UE 115-*f* and base station 105-*d*, which may be examples of a UE 115 and base station 105 described with reference to FIGS. 1-2. Process flow 600 may represent a method of transmitting a UE-initiated CSI report as a differential based on a baseline established by a previously reported CSI.

UE 115-*f* and base station 105-*d* may establish a low latency link as shown in step 605. The low latency communication link may use a first TTI duration in a system that supports operation with the first TTI duration and a second TTI duration that may be greater than the first.

At step 610, base station 105-*d* may send a pilot signal to UE 115-*f* across the low latency link established in step 605. The pilot signal may be a known data pattern that is processed in a known manner to both base station 105-*d* and UE 115-*f*. UE 115-*f* may use the pilot signal as a reference, for example, for calculating the channel response.

At step 615, UE 115-*f* may determine a first CSI based on, for example, the pilot signal sent in step 610. This CSI may be used as a reference for future channel responses in determining if the quality of the low latency link is improving or getting worse. At step 620, UE 115-*f* may transmit the CSI report to base station 105-*d*.

At step 625, base station 105-*d* may send another pilot signal. This pilot signal may be a known pattern that is processed in a known manner to both base station 105-*d* and UE 115-*f*. UE 115-*f* may use the pilot signal as a reference, for example, for calculating the channel response. UE 115-*f* may then use the pilot signal to determine a CSI differential in step 630. The CSI differential may not be a full CSI report, but instead may be a reference as to whether channel conditions have improved or gotten worse since the previous pilot signal transmission. UE 115 may then report the CSI differential to base station 105-d, for example, across the low latency link established in step 605.

At step 635, UE 115-f may transmit the UE-initiated CSI differential (e.g., in a 1-bit field of an uplink transmission).

Figure 7:
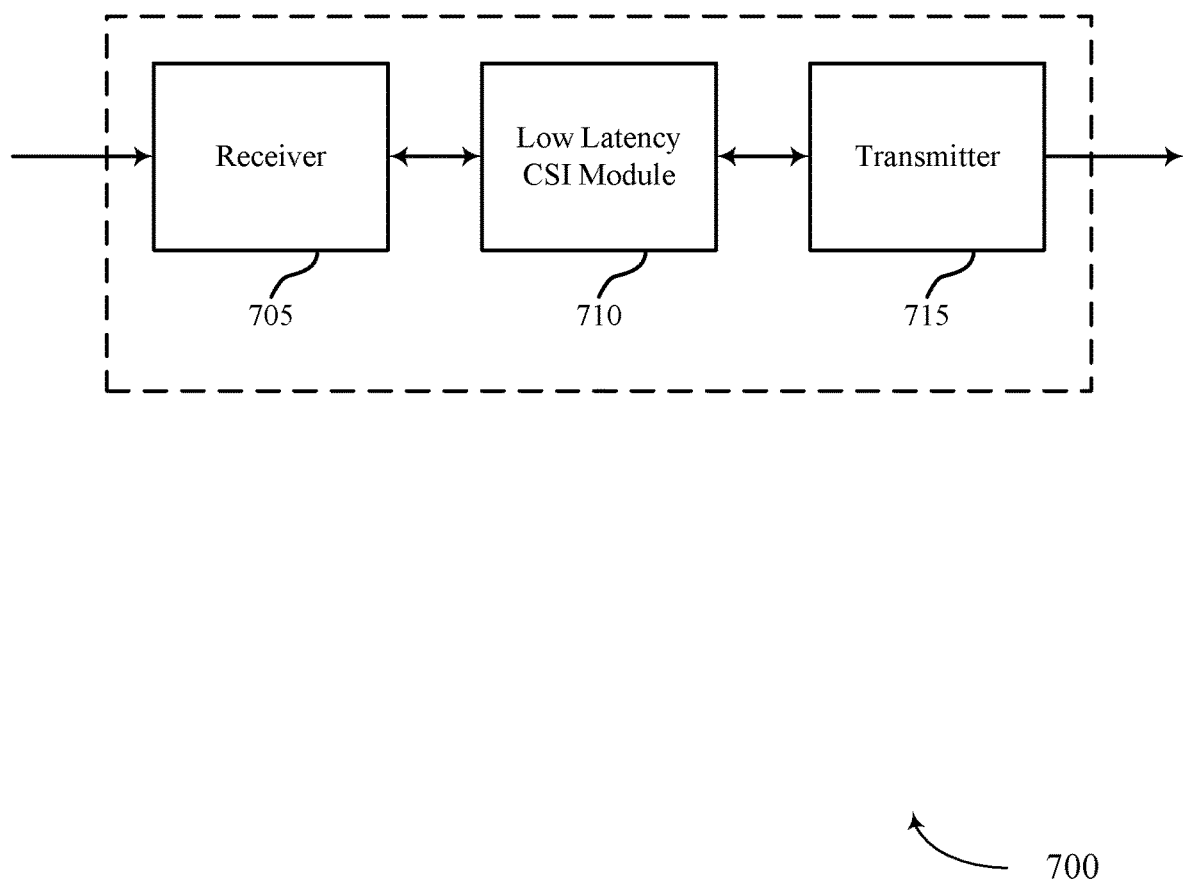
FIGS. 7-9 show block diagrams of a wireless device or devices that support low latency PUCCH with SR and CSI in accordance with various aspects of the present disclosure.

FIG. 7 shows a block diagram of a wireless device 700 that supports low latency PUCCH with SR and CSI in accordance with various aspects of the present disclosure. Wireless device 700 may be an example of aspects of a UE 115 described with reference to FIGS. 1-6. Wireless device 700 may include a receiver 705, a low latency CSI module 710, or a transmitter 715. Wireless device 700 may also include a processor. Each of these components may be in communication with one another.

The receiver 705 may receive information such as packets, user data, or control information associated with various information channels (e.g., control channels, data channels, and information related to low latency PUCCH with SR and CSI, etc.). Information may be passed on to the low latency CSI module 710, and to other components of wireless device 700. In some examples, the receiver 705 may receive signaling that indicates the set of reserved resources. In some examples, the signaling includes a downlink grant.

The low latency CSI module 710 may determine CSI for a communication link that uses a first TTI duration in a system that supports operation with the first TTI duration and a second TTI duration that is greater than the first, identify resources of an unscheduled uplink channel on which to transmit a report with the determined CSI, and transmit the report on the identified resources.

The transmitter 715 may transmit signals received from other components of wireless device 700. In some examples, the transmitter 715 may be collocated with the receiver 705 in a transceiver. The transmitter 715 may include a single antenna, or it may include a plurality of antennas.

Figure 8:
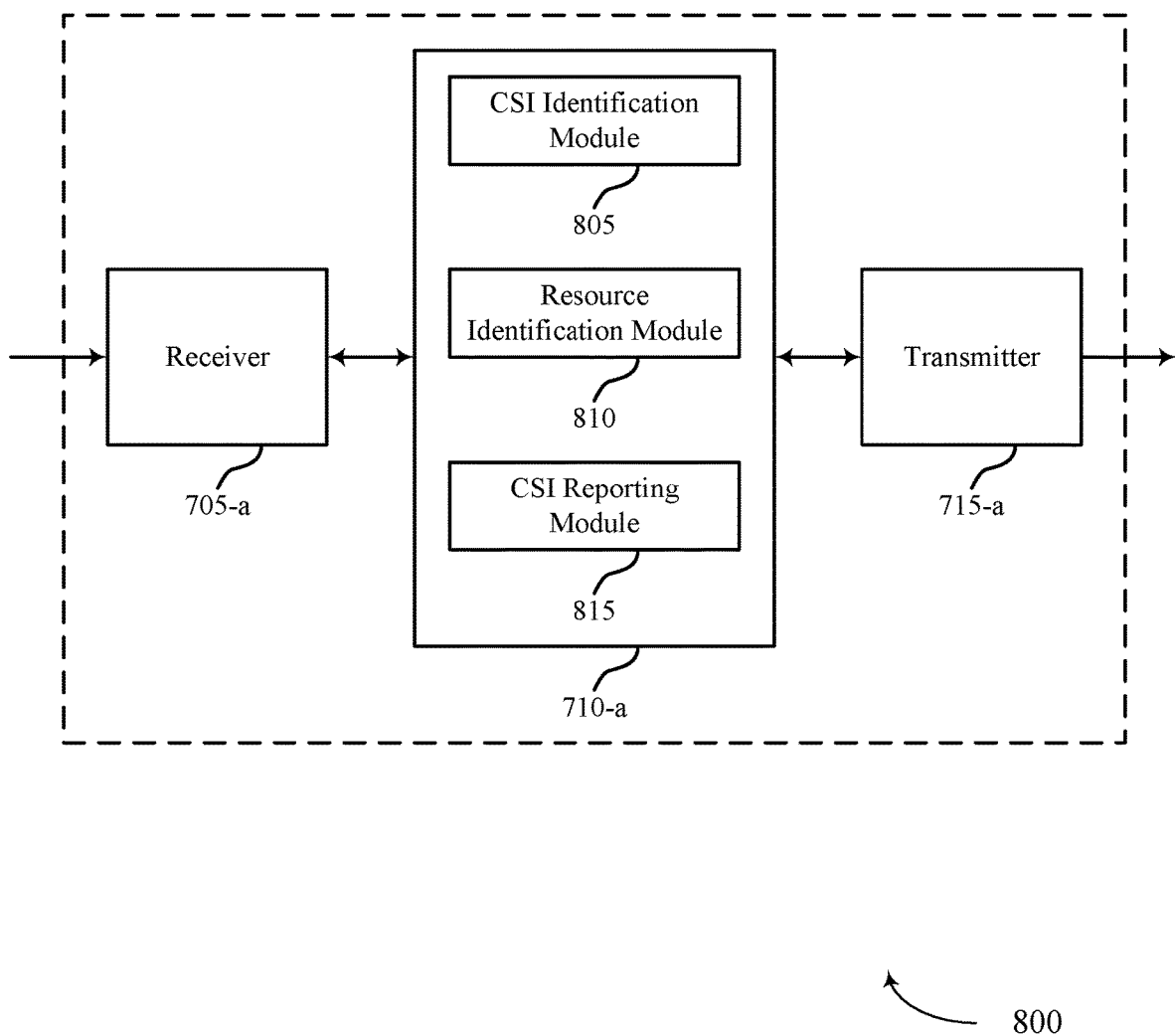

FIG. 8 shows a block diagram of a wireless device 800 that supports low latency PUCCH with SR and CSI in accordance with various aspects of the present disclosure. Wireless device 800 may be an example of aspects of a wireless device 700 or a UE 115 described with reference to FIGS. 1-7. Wireless device 800 may include a receiver 705-a, a low latency CSI module 710-a, or a transmitter 715-a. Wireless device 800 may also include a processor. Each of these components may be in communication with one another. The low latency CSI module 710-a may also include a CSI identification module 805, a resource identification module 810, and a CSI reporting module 815.

The receiver 705-a may receive information which may be passed on to low latency CSI module 710-a, and to other components of wireless device 800. The low latency CSI module 710-a may perform the operations described with reference to FIG. 7. The transmitter 715-a may transmit signals received from other components of wireless device 800.

The CSI identification module 805 may determine CSI for a communication link that uses a first TTI duration in a system that supports operation with the first TTI duration and a second TTI duration that is greater than the first as described with reference to FIGS. 2-6. The CSI identification module 805 may also determine CSI for a communication link that uses a first TTI duration in a system that supports operation with the first TTI duration and a second TTI duration that is greater than the first.

The resource identification module 810 may identify resources of an unscheduled uplink channel on which to transmit a report with the determined CSI as described with reference to FIGS. 2-6. In some examples, identifying the resources of the unscheduled uplink channel includes selecting the resources from a set of resources reserved for UCI. The set of reserved resources may include resources reserved for an SR, the CSI report, or HARQ feedback, or the like. In some examples, the set of reserved resources includes a set of resource blocks of a TTI having the first TTI duration. The set of reserved resources may be based on a number of UEs for which the set of reserved resources may be allocated. The number of UEs, in turn, may include coherent users or non-coherent users, or both. In some examples, the set of reserved resources may be periodically allocated to different UEs within the system. Additionally or alternatively, identifying the resources of the unscheduled uplink channel may include determining that a TTI having the first TTI duration is available for CSI reporting.

The CSI reporting module 815 may transmit the report on the identified resources as described with reference to FIGS. 2-6. In some examples, the report may be transmitted with a different cyclic shift from an uplink reference signal. The CSI reporting module 815 may also transmit a report with CSI for a communication link that uses a first TTI duration in a system that supports operation with the first TTI duration and a second TTI duration that is greater than the first.

Figure 9:
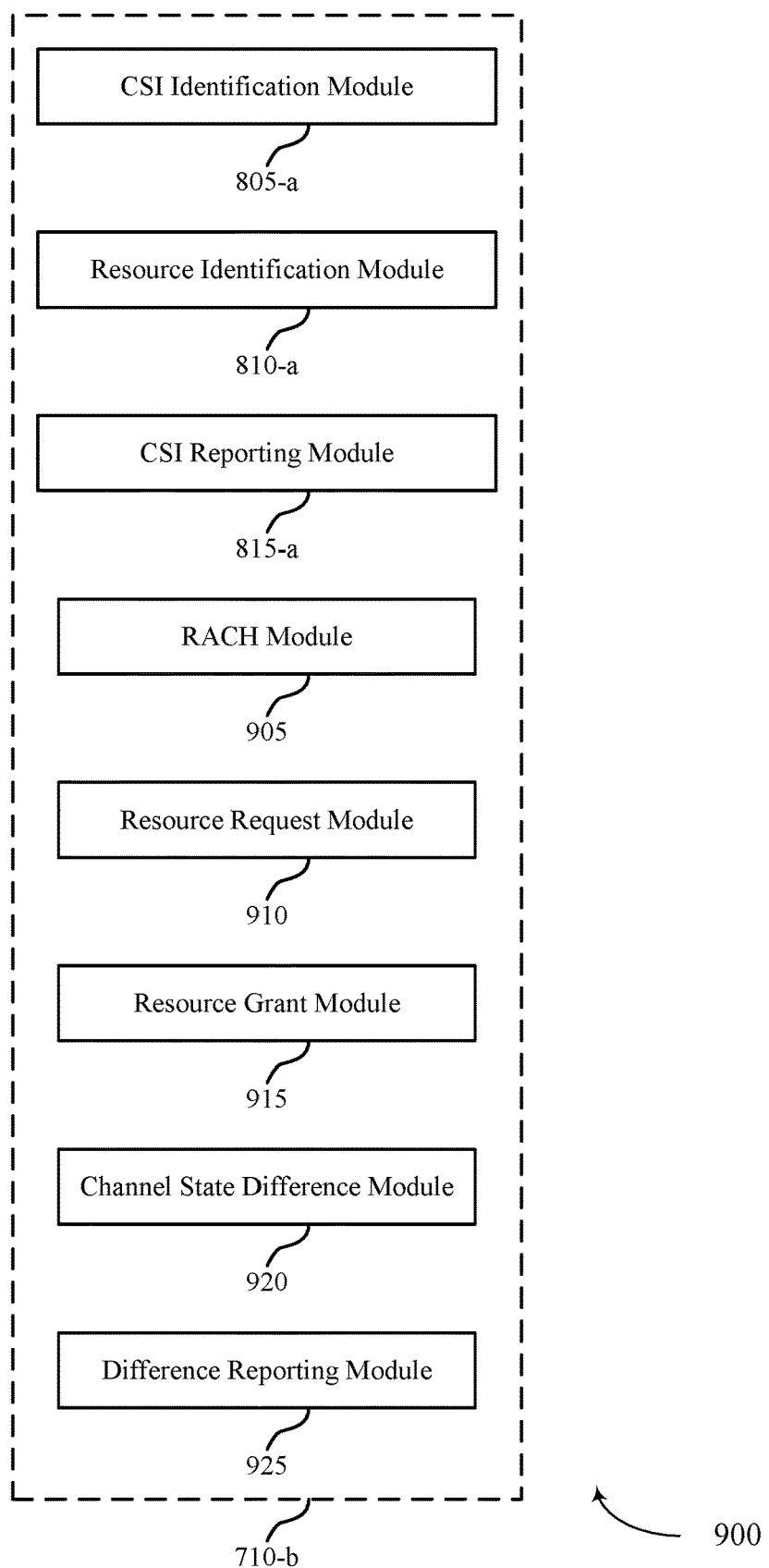

FIG. 9 shows a block diagram 900 of a low latency CSI module 710-b which may be a component of a wireless device 700 or a wireless device 800 that supports low latency PUCCH with SR and CSI in accordance with various aspects of the present disclosure. The low latency CSI module 710-b may be an example of aspects of a low latency CSI module 710 described with reference to FIGS. 7-8. The low latency CSI module 710-b may include a CSI identification module 805-a, a resource identification module 810-a, and a CSI reporting module 815-a. Each of these modules may perform the functions described with reference to FIG. 8. The low latency CSI module 710-b may also include a RACH module 905, a resource request module 910, a resource grant module 915, a channel state difference module 920, and a difference reporting module 925.

The RACH module 905 may transmit a RACH message as described with reference to FIGS. 2-6. The RACH module 905 may also receive a message responsive to the RACH message, such that the resources of an unscheduled uplink channel are identified based on the responsive message. The RACH module 905 may also receive a message responsive to the RACH message, such that the responsive message may include a grant for uplink resources on which to transmit the report with the CSI or the signaling that indicates the difference between the reported CSI and the change in the channel state.

The resource request module 910 may transmit a request for resources on which to send a report with the determined CSI as described with reference to FIGS. 2-6.

The resource grant module 915 may receive a grant for uplink resources for the report in response to the request as described with reference to FIGS. 2-6. In some examples, the uplink resources are selected from a set of resources reserved for UCI. In some examples, the set of reserved resources includes resources reserved for SR, CSI reports, and/or HARQ feedback. The set of reserved resources may be reserved based on a number of UEs for which the set of reserved resources may be allocated, and the number of UEs may include coherent users or non-coherent users, or both. In some examples, the grant for uplink resources is received in a downlink data channel. The resource grant module 915 may receive a grant for resources on which to send the report with the CSI or the signaling that indicates the difference between the reported CSI and the change in the channel state in a downlink data channel.

The channel state difference module 920 may determine a change in a channel state for the communication link as described with reference to FIGS. 2-6.

The difference reporting module 925 may transmit signaling that indicates a difference between the reported CSI and the change in the channel state as described with reference to FIGS. 2-6. In some examples, the report with the CSI or the signaling that indicates the difference between reported CSI and the change in the channel state may be transmitted on resources selected from a set of resources reserved for UCI. In some examples, the set of reserved resources includes resources reserved for SR, CSI reports, HARQ feedback, or the like. In some examples, the set of reserved resources is reserved based on a number of UEs for which the set of reserved resources is allocated. The number of UEs may include either or both coherent users or non-coherent users. In some examples, the report with the CSI or the signaling that indicates the difference between the reported CSI and the change in the channel state are with a different cyclic shift from an uplink reference signal.

Figure 10:
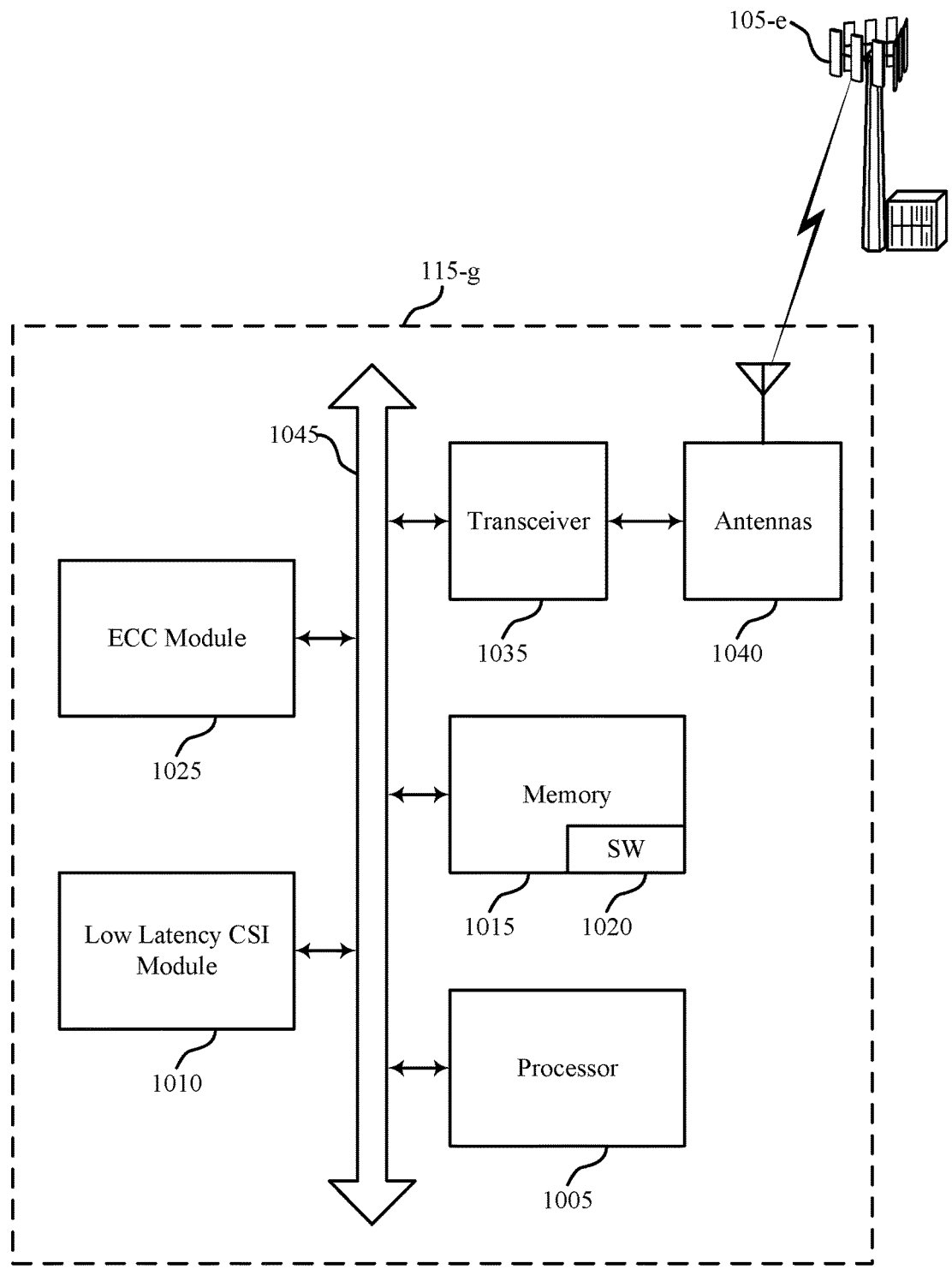
FIG. 10 illustrates a block diagram of a system, including a user equipment (UE), that supports low latency PUCCH with SR and CSI in accordance with various aspects of the present disclosure.

FIG. 10 shows a diagram of a system 1000, including a UE, that supports low latency PUCCH with SR and CSI in accordance with various aspects of the present disclosure. System 1000 may include UE 115-*g*, which may be an example of a wireless device 700, a wireless device 800, or a UE 115 described with reference to FIGS. 1, 2 and 7-9. UE 115-*g* may include a low latency CSI module 1010, which may be an example of a low latency CSI module 710 described with reference to FIGS. 7-9. UE 115-*g* may also include an ECC Module 1025 that may enable ECC operations as described herein. UE 115-*g* may also include components for bi-directional voice and data communications including components for transmitting communications and components for receiving communications. For example, UE 115-*g* may communicate bi-directionally with base station 105-*e*.

UE 115-*g* may also include a processor 1005, and memory 1015 (including software (SW) 1020), a transceiver 1035, and one or more antenna(s) 1040, each of which may communicate, directly or indirectly, with one another (e.g., via buses 1045). The transceiver 1035 may, in combination with the low latency CSI module 1010, communicate bi-directionally, via the antenna(s) 1040 or wired or wireless links, with one or more networks, as described above. For example, the transceiver 1035 may communicate bi-directionally with a base station 105 or another UE 115. The transceiver 1035 may include a modem to modulate the packets and provide the modulated packets to the antenna(s) 1040 for transmission, and to demodulate packets received from the antenna(s) 1040.

The memory 1015 may include random access memory (RAM) and read only memory (ROM). The memory 1015 may store computer-readable, computer-executable software/firmware code 1020 including instructions that, when executed, cause the processor 1005 to perform various functions described herein (e.g., low latency PUCCH with SR and CSI, etc.), including the functions described with reference to the low latency CSI module 1010 or the eCC module 1025, or both. Alternatively, the software/firmware code 1020 may not be directly executable by the processor 1005 but cause a computer (e.g., when compiled and executed) to perform functions described herein. The processor 1005 may include an intelligent hardware device, (e.g., a central processing unit (CPU), a microcontroller, an application specific integrated circuit (ASIC), etc.).

Figure 11:
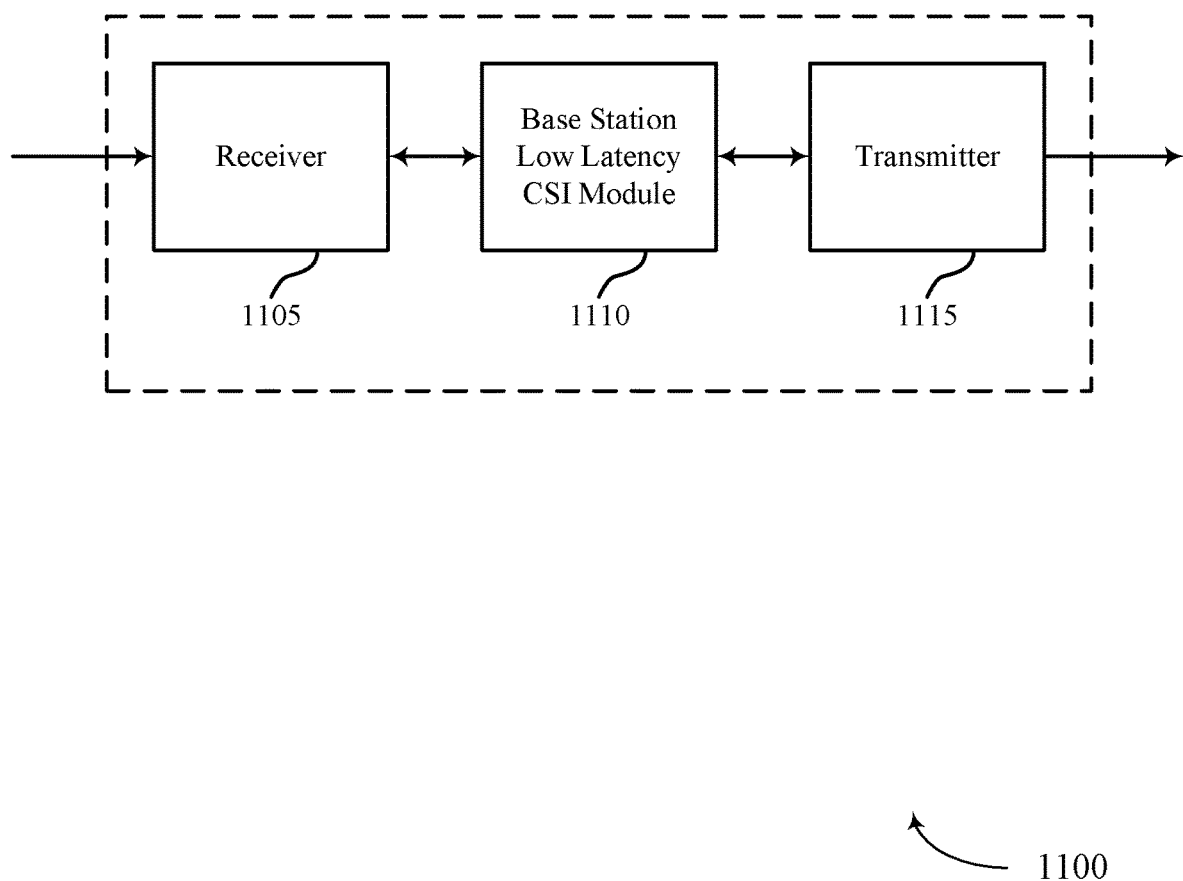
FIGS. 11-13 show block diagrams of a wireless device or devices that support low latency PUCCH with SR and CSI in accordance with various aspects of the present disclosure.

FIG. 11 shows a block diagram of a wireless device 1100 that supports low latency PUCCH with SR and CSI in accordance with various aspects of the present disclosure. Wireless device 1100 may be an example of aspects of a base station 105 described with reference to FIGS. 1-10. Wireless device 1100 may include a receiver 1105, a base station low latency CSI module 1110, or a transmitter 1115. Wireless device 1100 may also include a processor. Each of these components may be in communication with one another.

The receiver 1105 may receive information such as packets, user data, or control information associated with various information channels (e.g., control channels, data channels, and information related to low latency PUCCH with SR and CSI, etc.). Information may be passed on to the base station low latency CSI module 1110, and to other components of wireless device 1100.

The base station low latency CSI module 1110 may determine a set of resources reserved for UCI, and receive at least one of a report with CSI, a request for resources on which to send a CSI report, or signaling that indicates a change in CSI on resources of the set of reserved resources from a UE, the communicating using a first TTI duration in a system that supports operation with the first TTI duration and a second TTI duration that is greater than the first.

The transmitter 1115 may transmit signals received from other components of wireless device 1100. In some examples, the transmitter 1115 may be collocated with the receiver 1105 in a transceiver. The transmitter 1115 may include a single antenna, or it may include a plurality of antennas.

Figure 12:
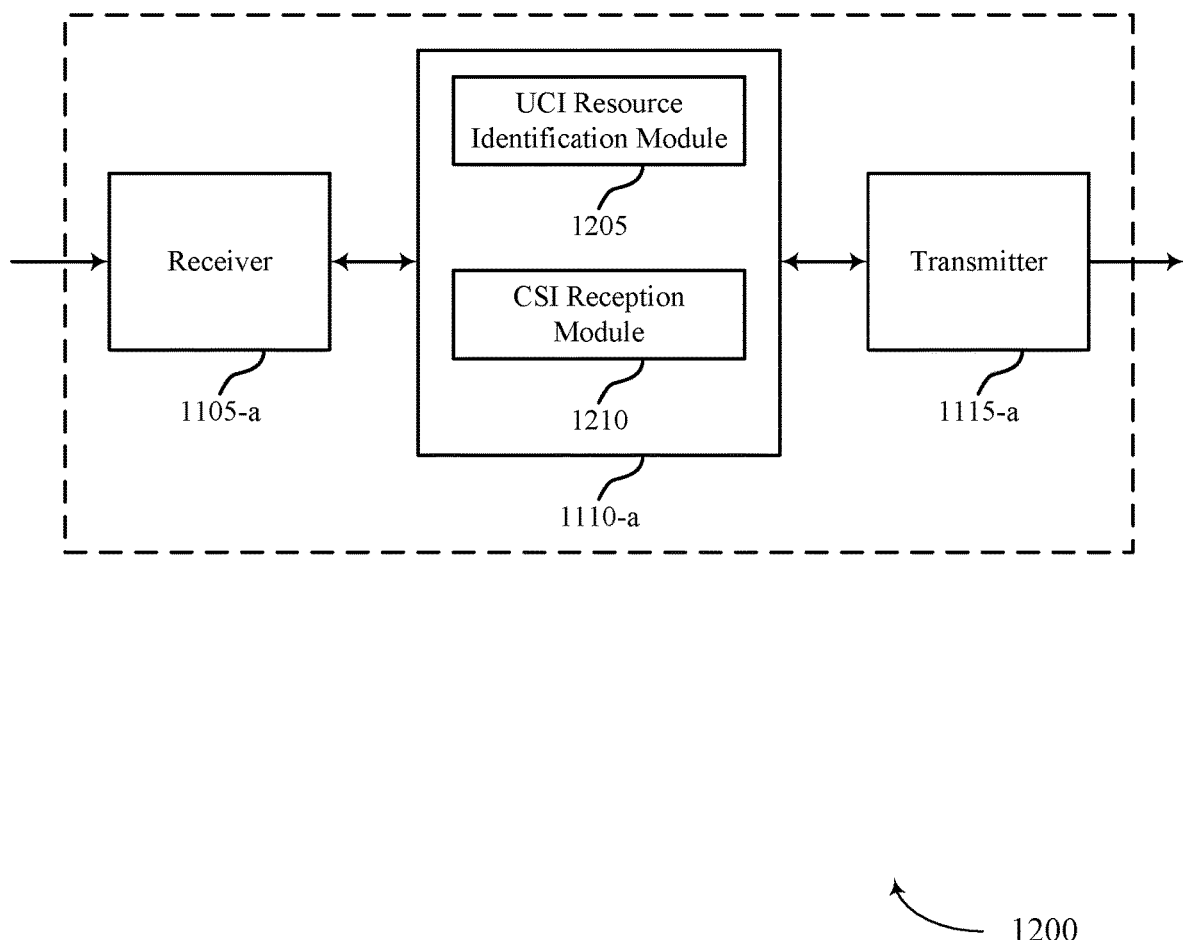

FIG. 12 shows a block diagram of a wireless device 1200 that supports low latency PUCCH with SR and CSI in accordance with various aspects of the present disclosure. Wireless device 1200 may be an example of aspects of a wireless device 1100 or a base station 105 described with reference to FIGS. 1-11. Wireless device 1200 may include a receiver 1105-*a*, a base station low latency CSI module 1110-*a*, or a transmitter 1115-*a*. Wireless device 1200 may also include a processor. Each of these components may be in communication with one another. The base station low latency CSI module 1110-*a* may also include a UCI resource identification module 1205, and a CSI reception module 1210.

The receiver 1105-*a* may receive information which may be passed on to base station low latency CSI module 1110-*a*, and to other components of wireless device 1200. The base station low latency CSI module 1110-*a* may perform the operations described with reference to FIG. 11. The transmitter 1115-*a* may transmit signals received from other components of wireless device 1200.

The UCI resource identification module 1205 may determine a set of resources reserved for UCI as described with reference to FIGS. 2-6. In some examples, the set of reserved resources includes resources reserved for an SR, the CSI report, or HARQ feedback, or the like. The set of reserved resources may include a set of resource blocks of a TTI having the first TTI duration. In some examples, the set of reserved resources may be based on a number UEs for which the set of reserved resources may be allocated, and the number of UEs may include coherent users or non-coherent users, or both. The set of reserved resources may be periodically allocated to different UEs within the system. The UCI resource identification module 1205 may also transmit to the UE signaling indicating that a TTI having the first TTI duration is reserved for CSI reporting.

The CSI reception module 1210 may receive at least one of a report with CSI, a request for resources on which to send a CSI report, or signaling that indicates a change in CSI on resources of the set of reserved resources from a UE, the communicating using a first TTI duration in a system that supports operation with the first TTI duration and a second TTI duration that is greater than the first as described with reference to FIGS. 2-6.

Figure 13:
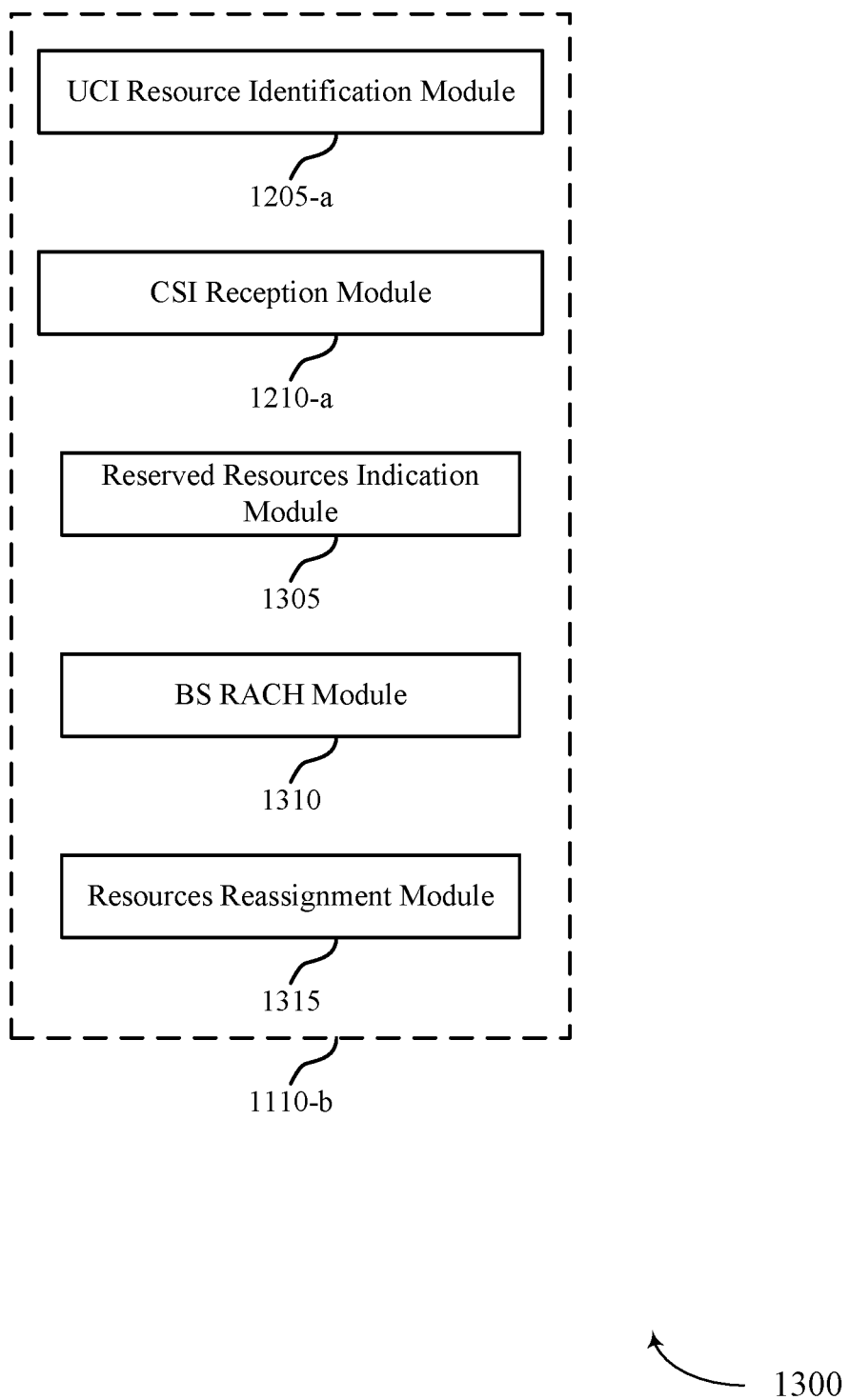

FIG. 13 shows a block diagram 1300 of a base station low latency CSI module 1110-*b* which may be a component of a wireless device 1100 or a wireless device 1200 that supports low latency PUCCH with SR and CSI in accordance with various aspects of the present disclosure. The base station low latency CSI module 1110-*b* may be an example of aspects of a base station low latency CSI module 1110 described with reference to FIGS. 11-12. The base station low latency CSI module 1110-*b* may include a UCI resource identification module 1205-*a*, and a CSI reception module 1210-*a*. Each of these modules may perform the functions described with reference to FIG. 12. The base station low latency CSI module 1110-*b* may also include a reserved resources indication module 1305, a BS RACH module 1310, and a resources reassignment module 1315.

The reserved resources indication module 1305 may transmit signaling that indicates the set of reserved resources to the UE as described with reference to FIGS. 2-6. In some examples, the signaling that indicates the set of reserved resources includes a downlink grant.

The BS RACH module 1310 may receive a RACH message from the UE as described with reference to FIGS. 2-6.

The resources reassignment module 1315 may transmit to a different UE signaling that indicates a reassignment of the reserved resources as described with reference to FIGS. 2-6.

Figure 14:
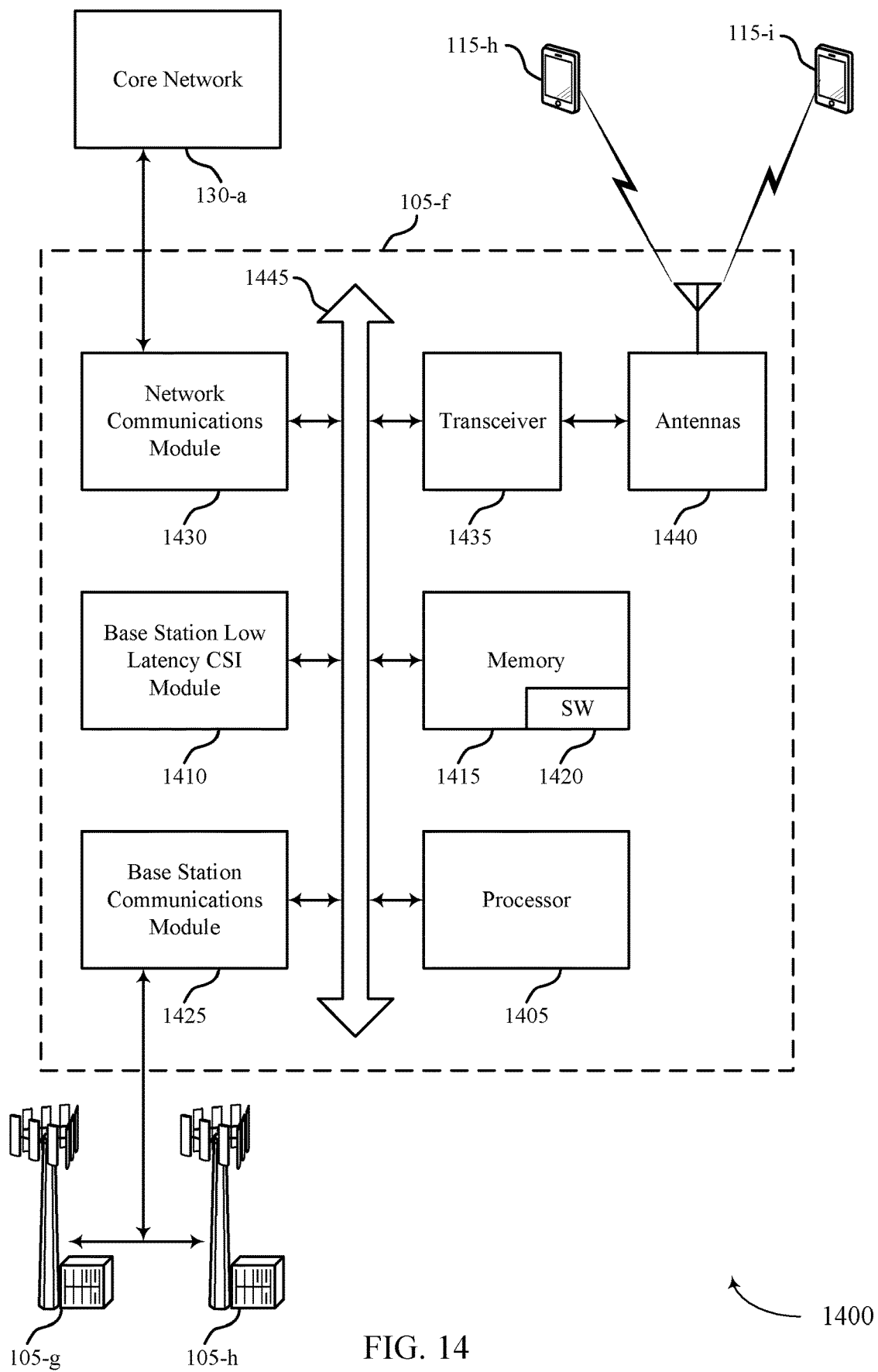
FIG. 14 illustrates a block diagram of a system, including a base station, that supports low latency PUCCH with SR and CSI in accordance with various aspects of the present disclosure.

FIG. 14 shows a diagram of a system 1400, including a base station that supports low latency PUCCH with SR and CSI in accordance with various aspects of the present disclosure. System 1400 may include base station 105-*f*, which may be an example of a wireless device 1100, a wireless device 1200, or a base station 105 described with reference to FIGS. 1, 2 and 11-13. Base Station 105-*f* may include a base station low latency CSI module 1410, which may be an example of a base station low latency CSI module 1110 described with reference to FIGS. 11-13. Base Station 105-*f* may also include components for bi-directional voice and data communications including components for transmitting communications and components for receiving communications. For example, base station 105-*f* may communicate bi-directionally with UE 115-*h* or UE 115-*i*.

In some cases, base station 105-*f* may have one or more wired backhaul links. Base station 105-*f* may have a wired backhaul link (e.g., S1 interface, etc.) to the core network 130. Base station 105-*f* may also communicate with other base stations 105, such as base station 105-*g* and base station 105-*h* via inter-base station backhaul links (e.g., an X2 interface). Each of the base stations 105 may communicate with UEs 115 using the same or different wireless communications technologies. In some cases, base station 105-*f* may communicate with other base stations such as 105-*g* or 105-*h* utilizing base station communications module 1425. In some examples, base station communications module 1425 may provide an X2 interface within an LTE/LTE-A wireless communication network technology to provide communication between some of the base stations 105. In some examples, base station 105-*f* may communicate with other base stations through core network 130. In some cases, base station 105-*f* may communicate with the core network 130 through network communications module 1430.

The base station 105-*f* may include a processor 1405, memory 1415 (including software (SW) 1420), transceiver 1435, and antenna(s) 1440, which each may be in communication, directly or indirectly, with one another (e.g., over bus system 1445). The transceivers 1435 may be configured (e.g., in combination with the base station low latency CSI module 1410) to communicate bi-directionally, via the antenna(s) 1440, with the UEs 115, which may be multi-mode devices. The transceiver 1435 (or other components of the base station 105-*f*) may also be configured to communicate bi-directionally, via the antennas 1440, with one or more other base stations (not shown). The transceiver 1435 may include a modem configured to modulate the packets and provide the modulated packets to the antennas 1440 for transmission, and to demodulate packets received from the antennas 1440. The base station 105-*f* may include multiple transceivers 1435, each with one or more associated antennas 1440. The transceiver may be an example of a combined receiver 1105 and transmitter 1115 of FIG. 11.

The memory 1415 may include RAM and ROM. The memory 1415 may also store computer-readable, computer-executable software code 1420 containing instructions that are configured to, when executed, cause the processor 1405 to perform various functions described herein (e.g., low latency PUCCH with SR and CSI, selecting coverage enhancement techniques, call processing, database management, message routing, etc.), including the functions described with reference to the base station low latency CSI module 1410. Alternatively, the software code 1420 may not be directly executable by the processor 1405 but be configured to cause the computer, e.g., when compiled and executed, to perform functions described herein. The processor 1405 may include an intelligent hardware device, e.g., a CPU, a microcontroller, an ASIC, etc. The processor 1405 may include various special purpose processors such as encoders, queue processing modules, base band processors, radio head controllers, digital signal processor (DSPs), and the like.

The base station communications module 1425 may manage communications with other base stations 105. In some cases, a communications management module may include a controller or scheduler for controlling communications with UEs 115 in cooperation with other base stations 105. For example, the base station communications module 1425 may coordinate scheduling for transmissions to UEs 115 for various interference mitigation techniques such as beamforming or joint transmission.

The components of wireless device 700, wireless device 800, low latency CSI module 710, wireless device 1100, wireless device 1200, base station low latency CSI module 1110, UE 115-*g*, and base station 105-*f* may, individually or collectively, be implemented with at least one application specific integrated circuit (ASIC) adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 15:
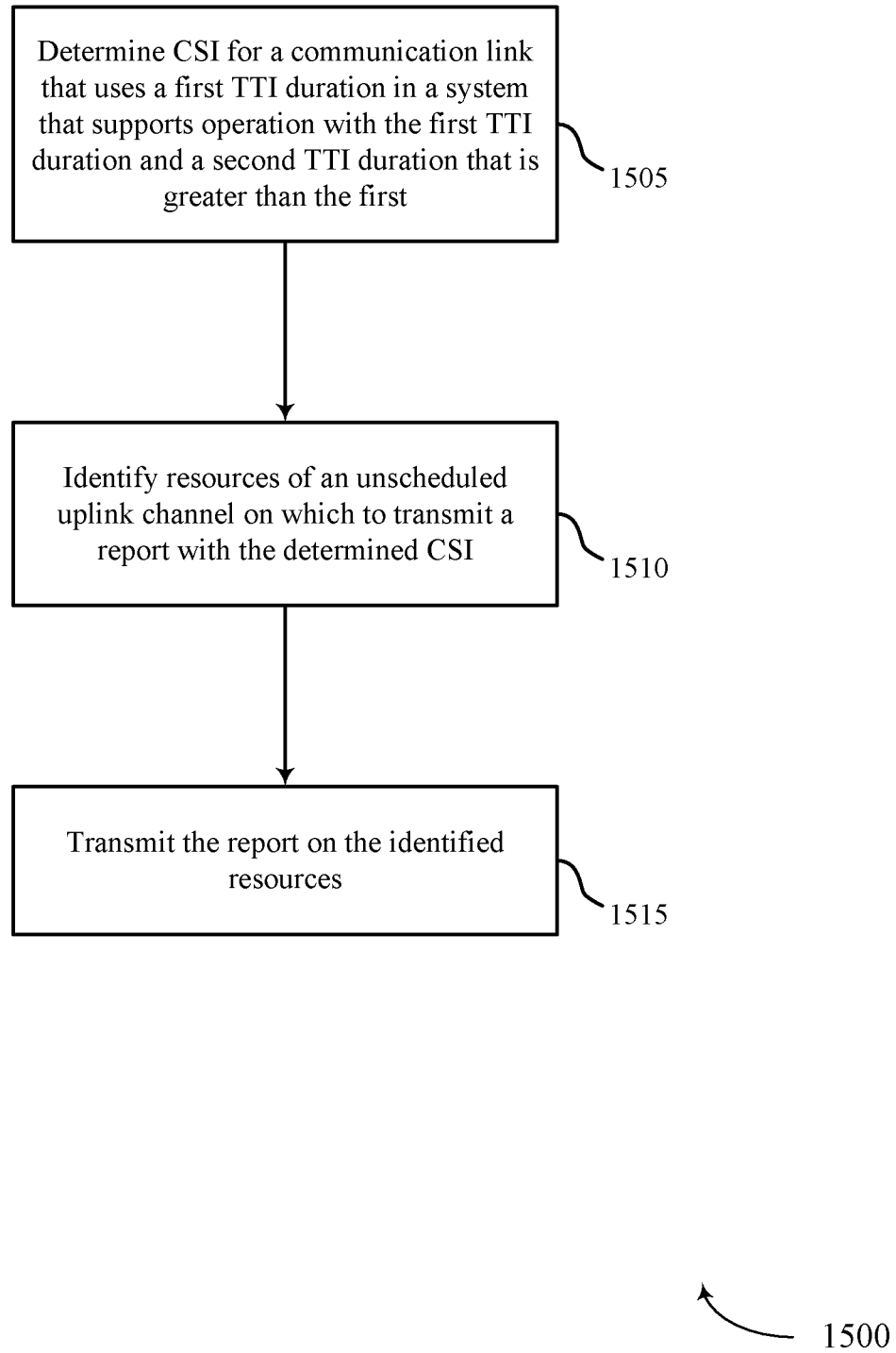
FIGS. 15-20 illustrate methods for low latency PUCCH with SR and CSI in accordance with various aspects of the present disclosure.

FIG. 15 shows a flowchart illustrating a method 1500 for low latency PUCCH with SR and CSI in accordance with various aspects of the present disclosure. The operations of method 1500 may be implemented by a UE 115 or its components as described with reference to FIGS. 1-14. For example, the operations of method 1500 may be performed by the low latency CSI module 710 or low latency CSI module 1010 as described with reference to FIGS. 7-10. In some examples, a UE 115 may execute a set of codes to control the functional elements of the UE 115 to perform the functions described below. Additionally or alternatively, the UE 115 may perform aspects the functions described below using special-purpose hardware.

At block 1505, the UE 115 may determine CSI for a communication link that uses a first TTI duration in a system that supports operation with the first TTI duration and a second TTI duration that is greater than the first as described with reference to FIGS. 2-6. In certain examples, the operations of block 1505 may be performed by the CSI identification module 805 as described with reference to FIG. 8 or the low latency CSI module 1010 in combination with the transceiver 1035 described with reference to FIG. 10.

At block 1510, the UE 115 may identify resources of an unscheduled uplink channel on which to transmit a report with the determined CSI as described with reference to FIGS. 2-6. Identifying the resources of the unscheduled uplink channel may include selecting the resources from a set of resources reserved for UCI. In some examples, identifying the resources of the unscheduled uplink channel includes determining that a TTI having the first TTI duration is available for CSI reporting. In certain examples, the operations of block 1510 may be performed by the resource identification module 810 as described with reference to FIG. 8 or the low latency CSI module 1010 in combination with the transceiver 1035 described with reference to FIG. 10.

At block 1515, the UE 115 may transmit the report on the identified resources as described with reference to FIGS. 2-6. The report may be transmitted with a different cyclic shift from an uplink reference signal. In certain examples, the operations of block 1515 may be performed by the CSI reporting module 815 as described with reference to FIG. 8 or the low latency CSI module 1010 in combination with the transceiver 1035 described with reference to FIG. 10.

In some examples, method 1500 includes receiving signaling that indicates the set of resources reserved for UCI. The signaling may be or include a downlink grant. In certain examples, such the operations may be performed by the transceiver 1035 described with reference to FIG. 10. The set of resources reserved for UCI may include resources reserved for a SR, a CSI report, or HARQ feedback, or any combination thereof. The set of resources reserved for UCI may include a set of resource blocks of a TTI having the first TTI duration. In some examples, the set of resources reserved for UCI is based at least in part on a number UEs for which the set of resources reserved for UCI is allocated, and the number of UEs may include coherent users or non-coherent users, or both.

Figure 16:
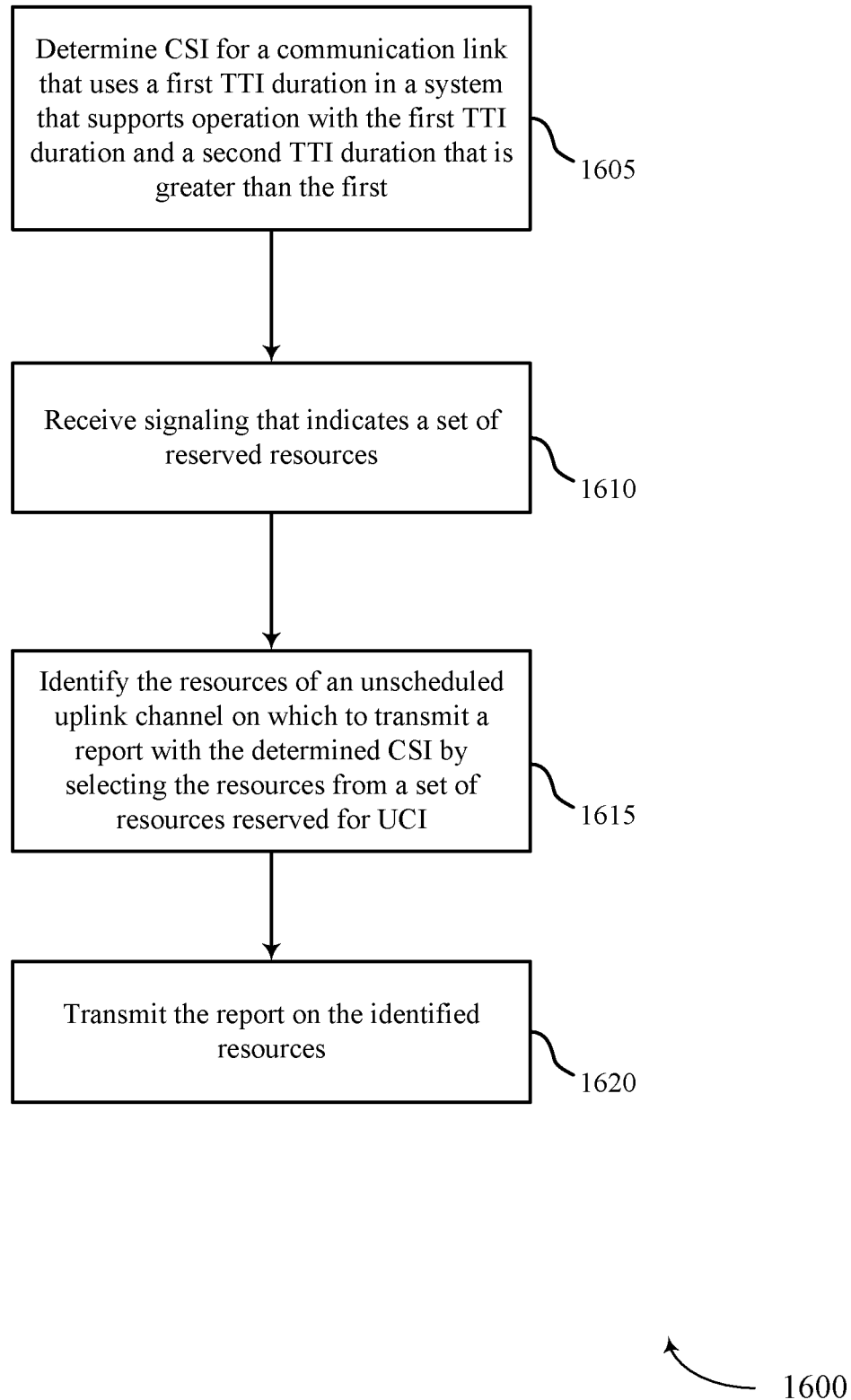

FIG. 16 shows a flowchart illustrating a method 1600 for low latency PUCCH with SR and CSI in accordance with various aspects of the present disclosure. The operations of method 1600 may be implemented by a UE 115 or its components as described with reference to FIGS. 1-14. For example, the operations of method 1600 may be performed by the low latency CSI module 710 as described with reference to FIGS. 7-10. In some examples, a UE 115 may execute a set of codes to control the functional elements of the UE 115 to perform the functions described below. Additionally or alternatively, the UE 115 may perform aspects the functions described below using special-purpose hardware. The method 1600 may also incorporate aspects of method 1500 of FIG. 15.

At block 1605, the UE 115 may determine CSI for a communication link that uses a first TTI duration in a system that supports operation with the first TTI duration and a second TTI duration that is greater than the first as described with reference to FIGS. 2-6. In certain examples, the operations of block 1605 may be performed by the CSI identification module 805 as described with reference to FIG. 8 or the low latency CSI module 1010 in combination with the transceiver 1035 as described with reference to FIG. 10.

At block 1610, the UE 115 may identify resources of an unscheduled uplink channel on which to transmit a report with the determined CSI as described with reference to FIGS. 2-6. In some cases, identifying the resources of the unscheduled uplink channel includes selecting the resources from a set of resources reserved for UCI. In certain examples, the operations of block 1610 may be performed by the resource identification module 810 as described with reference to FIG. 8 or the low latency CSI module 1010 in combination with the transceiver 1035 as described with reference to FIG. 10.

At block 1615, the UE 115 may transmit the report on the identified resources as described with reference to FIGS. 2-6. In certain examples, the operations of block 1615 may be performed by the CSI reporting module 815 as described with reference to FIG. 8 or the low latency CSI module 1010 in combination with the transceiver 1035 as described with reference to FIG. 10.

At block 1620, the UE 115 may receive signaling that indicates the set of reserved resources as described with reference to FIGS. 2-6. In certain examples, the operations of block 1620 may be performed by the receiver 705 as described with reference to FIG. 7 or 8 or the low latency CSI module 1010 in combination with the transceiver 1035 as described with reference to FIG. 10.

Figure 17:
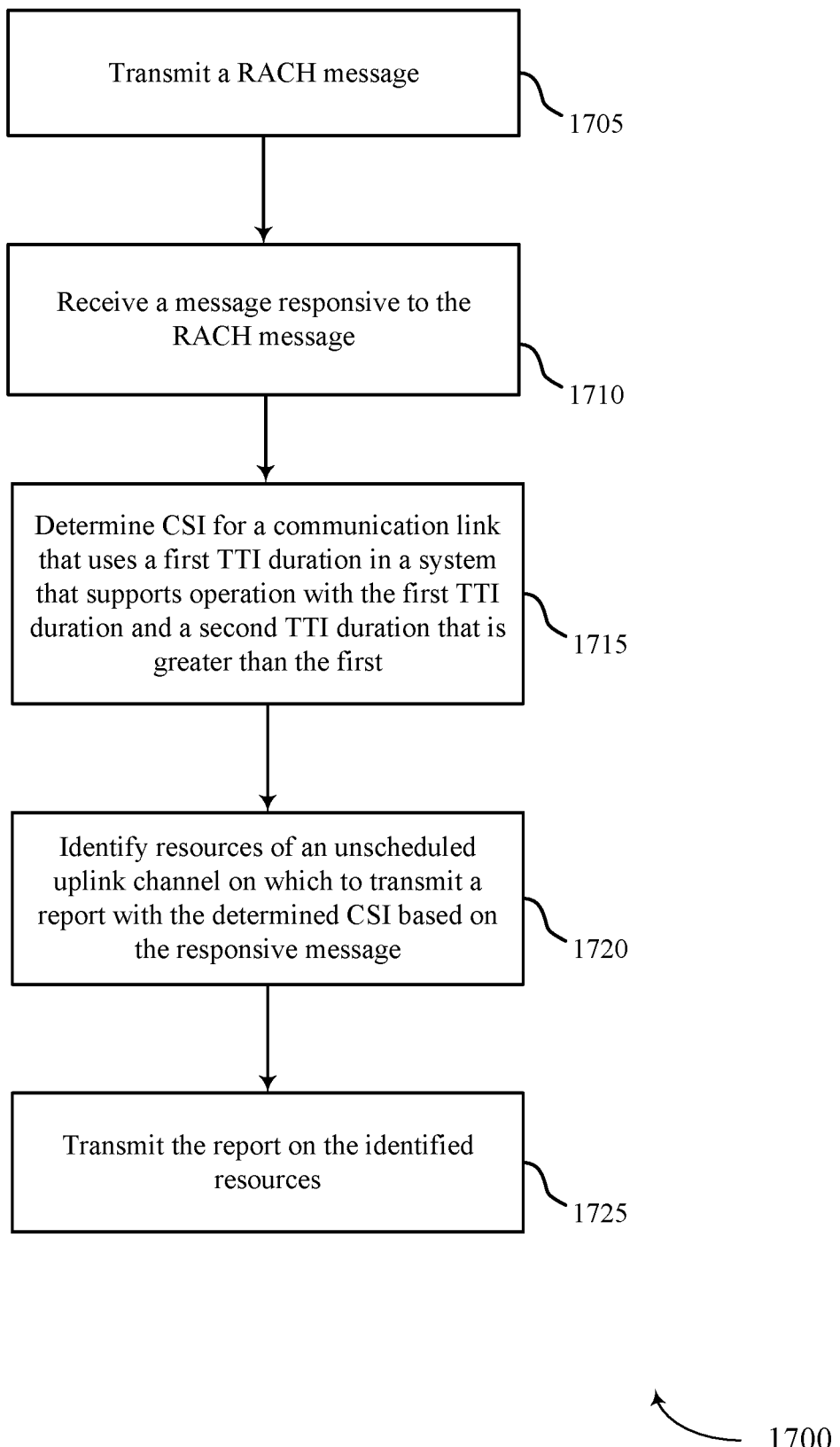

FIG. 17 shows a flowchart illustrating a method 1700 for low latency PUCCH with SR and CSI in accordance with various aspects of the present disclosure. The operations of method 1700 may be implemented by a UE 115 or its components as described with reference to FIGS. 1-14. For example, the operations of method 1700 may be performed by the low latency CSI module 710 as described with reference to FIGS. 7-10. In some examples, a UE 115 may execute a set of codes to control the functional elements of the UE 115 to perform the functions described below. Additionally or alternatively, the UE 115 may perform aspects the functions described below using special-purpose hardware. The method 1700 may also incorporate aspects of methods 1500 and 1600 of FIGS. 15 and 16.

At block 1705, the UE 115 may determine CSI for a communication link that uses a first TTI duration in a system that supports operation with the first TTI duration and a second TTI duration that is greater than the first as described with reference to FIGS. 2-6. In certain examples, the operations of block 1705 may be performed by the CSI identification module 805 as described with reference to FIG. 8. or the low latency CSI module 1010 in combination with the transceiver 1035 as described with reference to FIG. 10.

At block 1710, the UE 115 may identify resources of an unscheduled uplink channel on which to transmit a report with the determined CSI as described with reference to FIGS. 2-6. In certain examples, the operations of block 1710 may be performed by the resource identification module 810 as described with reference to FIG. 8. or the low latency CSI module 1010 in combination with the transceiver 1035 as described with reference to FIG. 10.

At block 1715, the UE 115 may transmit the report on the identified resources as described with reference to FIGS. 2-6. In certain examples, the operations of block 1715 may be performed by the CSI reporting module 815 as described with reference to FIG. 8 or the low latency CSI module 1010 in combination with the transceiver 1035 as described with reference to FIG. 10.

At block 1720, the UE 115 may transmit a RACH message as described with reference to FIGS. 2-6. In certain examples, the operations of block 1720 may be performed by the RACH module 905 as described with reference to FIG. 9 or the low latency CSI module 1010 in combination with the transceiver 1035 as described with reference to FIG. 10.

At block 1725, the UE 115 may receive a message responsive to the RACH message, such that the resources of the unscheduled uplink channel are identified based on the responsive message as described with reference to FIGS. 2-6. In certain examples, the operations of block 1725 may be performed by the RACH module 905 as described with reference to FIG. 9 or the low latency CSI module 1010 in combination with the transceiver 1035 as described with reference to FIG. 10.

Figure 18:
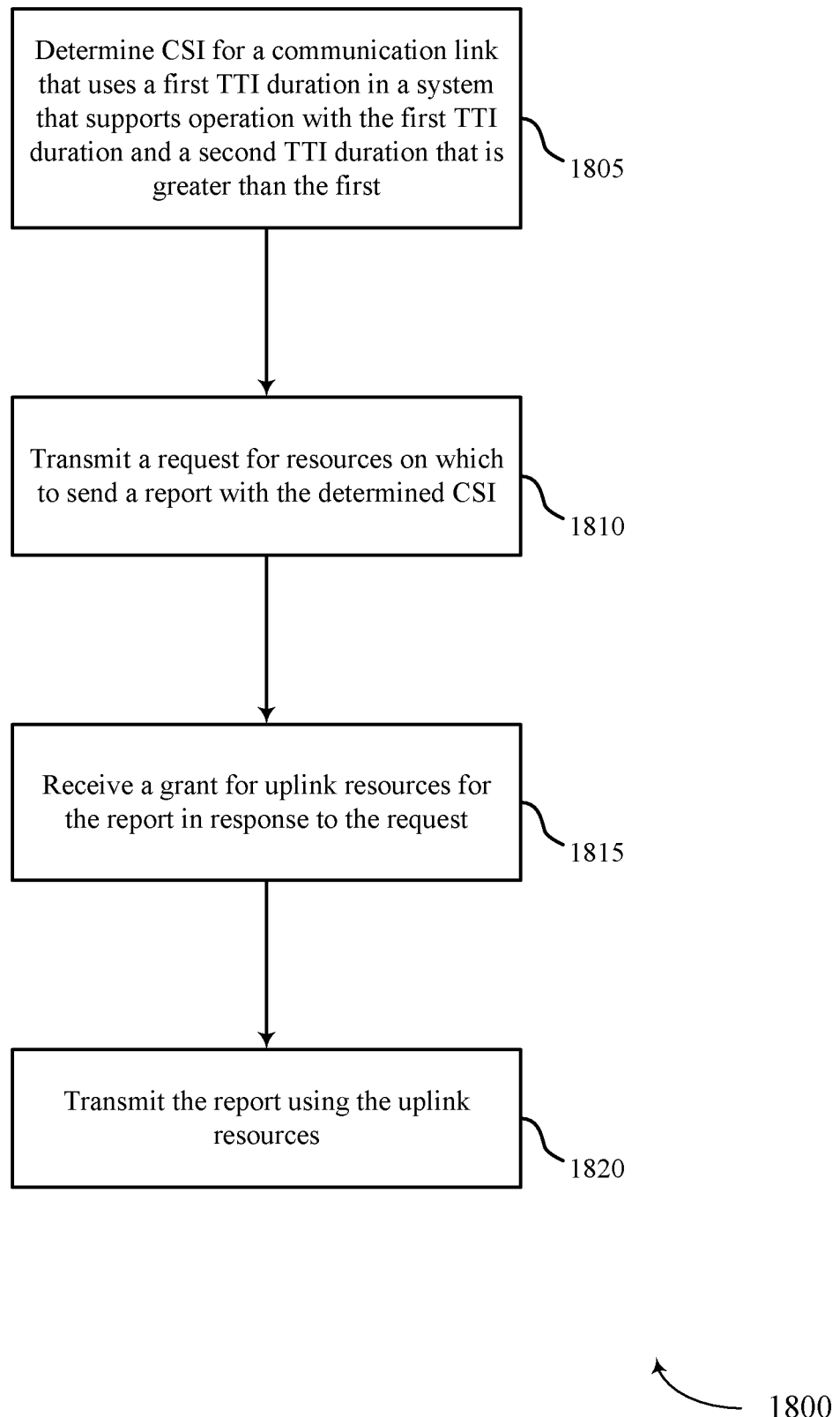

FIG. 18 shows a flowchart illustrating a method 1800 for low latency PUCCH with SR and CSI in accordance with various aspects of the present disclosure. The operations of method 1800 may be implemented by a UE 115 or its components as described with reference to FIGS. 1-14. For example, the operations of method 1800 may be performed by the low latency CSI module 710 as described with reference to FIGS. 7-10. In some examples, a UE 115 may execute a set of codes to control the functional elements of the UE 115 to perform the functions described below. Additionally or alternatively, the UE 115 may perform aspects the functions described below using special-purpose hardware. The method 1800 may also incorporate aspects of methods 1500, 1600, and 1700 of FIGS. 15-17.

At block 1805, the UE 115 may determine CSI for a communication link that uses a first TTI duration in a system that supports operation with the first TTI duration and a second TTI duration that is greater than the first as described with reference to FIGS. 2-6. In certain examples, the operations of block 1805 may be performed by the CSI identification module 805 as described with reference to FIG. 8 or the low latency CSI module 1010 in combination with the transceiver 1035 as described with reference to FIG. 10.

At block 1810, the UE 115 may transmit a request for resources on which to send a report with the determined CSI as described with reference to FIGS. 2-6. In certain examples, the operations of block 1810 may be performed by the resource request module 910 as described with reference to FIG. 9 or the low latency CSI module 1010 in combination with the transceiver 1035 as described with reference to FIG. 10.

At block 1815, the UE 115 may receive a grant for uplink resources for the report in response to the request as described with reference to FIGS. 2-6. In certain examples, the operations of block 1815 may be performed by the resource grant module 915 as described with reference to FIG. 9 or the low latency CSI module 1010 in combination with the transceiver 1035 as described with reference to FIG. 10.

At block 1820, the UE 115 may transmit the report using the uplink resources as described with reference to FIGS. 2-6. In certain examples, the operations of block 1820 may be performed by the CSI reporting module 815 as described with reference to FIG. 8 or the low latency CSI module 1010 in combination with the transceiver 1035 as described with reference to FIG. 10.

Figure 19:
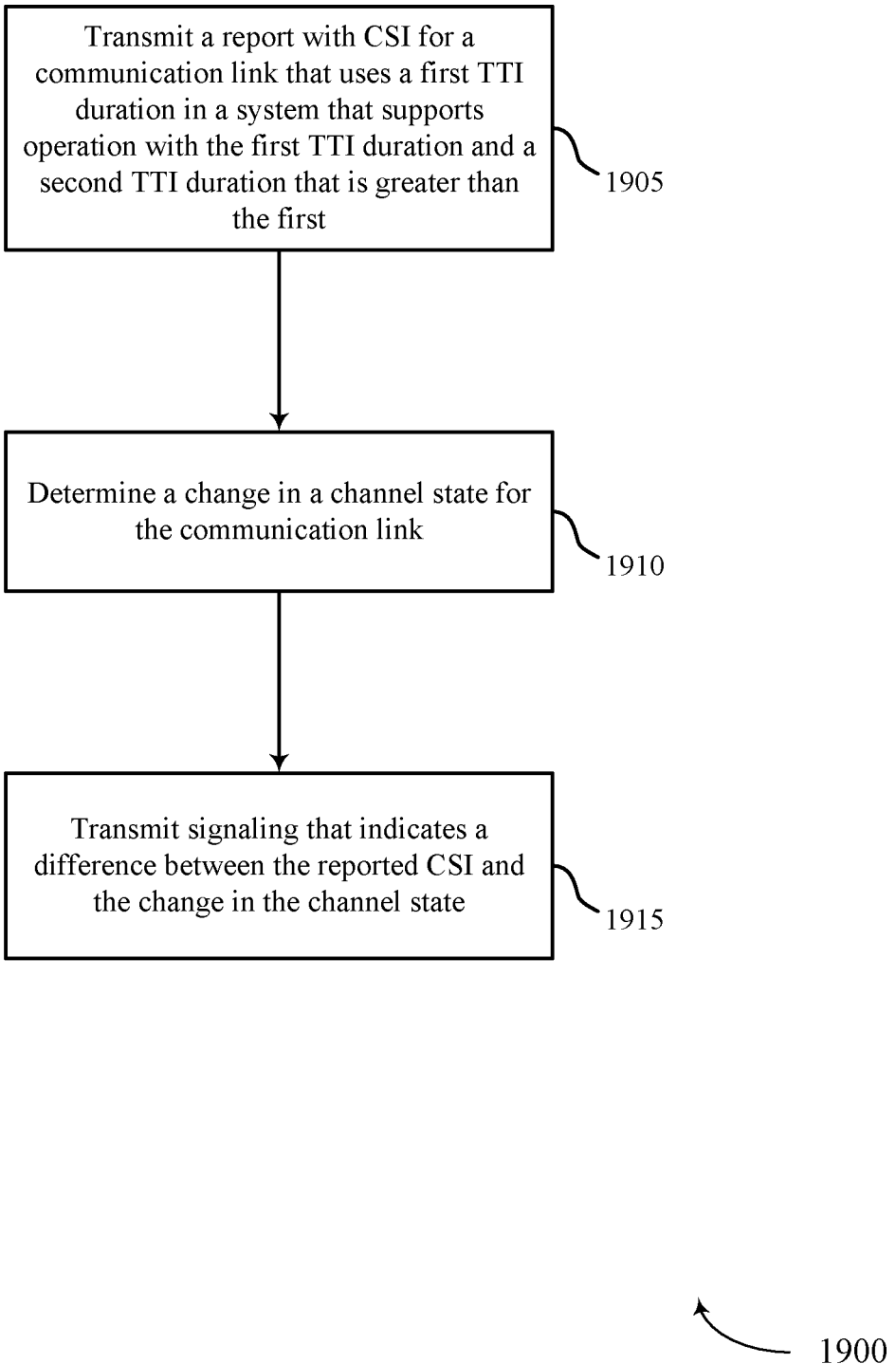

FIG. 19 shows a flowchart illustrating a method 1900 for low latency PUCCH with SR and CSI in accordance with various aspects of the present disclosure. The operations of method 1900 may be implemented by a UE 115 or its components as described with reference to FIGS. 1-14. For example, the operations of method 1900 may be performed by the low latency CSI module 710 as described with reference to FIGS. 7-10. In some examples, a UE 115 may execute a set of codes to control the functional elements of the UE 115 to perform the functions described below. Additionally or alternatively, the UE 115 may perform aspects the functions described below using special-purpose hardware. The method 1900 may also incorporate aspects of methods 1500, 1600, 1700, and 1800 of FIGS. 15-18.

At block 1905, the UE 115 may transmit a report with CSI for a communication link that uses a first TTI duration in a system that supports operation with the first TTI duration and a second TTI duration that is greater than the first as described with reference to FIGS. 2-6. In certain examples, the operations of block 1905 may be performed by the CSI reporting module 815 as described with reference to FIG. 8 or the low latency CSI module 1010 in combination with the transceiver 1035 as described with reference to FIG. 10.

At block 1910, the UE 115 may determine a change in a channel state for the communication link as described with reference to FIGS. 2-6. In certain examples, the operations of block 1910 may be performed by the channel state difference module 920 as described with reference to FIG. 9 or the low latency CSI module 1010 in combination with the transceiver 1035 as described with reference to FIG. 10.

At block 1915, the UE 115 may transmit signaling that indicates a difference between the reported CSI and the change in the channel state as described with reference to FIGS. 2-6. In certain examples, the operations of block 1915 may be performed by the difference reporting module 925 as described with reference to FIG. 9 or the low latency CSI module 1010 in combination with the transceiver 1035 as described with reference to FIG. 10.

In some examples of the method 1900, the report with the CSI or the signaling that indicates the difference between the CSI and the change in the channel state is transmitted on resources selected from a set of resources reserved for UCI. The set of resources reserved for UCI may include resources reserved for SR, CSI reports, HARQ feedback, or any combination thereof. The set of resources reserved for UCI may be reserved based at least in part on a number of UEs for which the set of resources reserved for UCI is allocated, and the number of UEs may include coherent users or non-coherent users, or both. The report with the CSI or the signaling that indicates the difference between the CSI and the change in the channel state is transmitted with a different cyclic shift from an uplink reference signal.

Method 1900 may also include receiving a grant for resources on which to send the report with the CSI or the signaling that indicates the difference between the CSI and the change in the channel state in a downlink data channel. In certain examples, such the operations may be performed by the transceiver 1035 as described with reference to FIG. 10.

Figure 20:
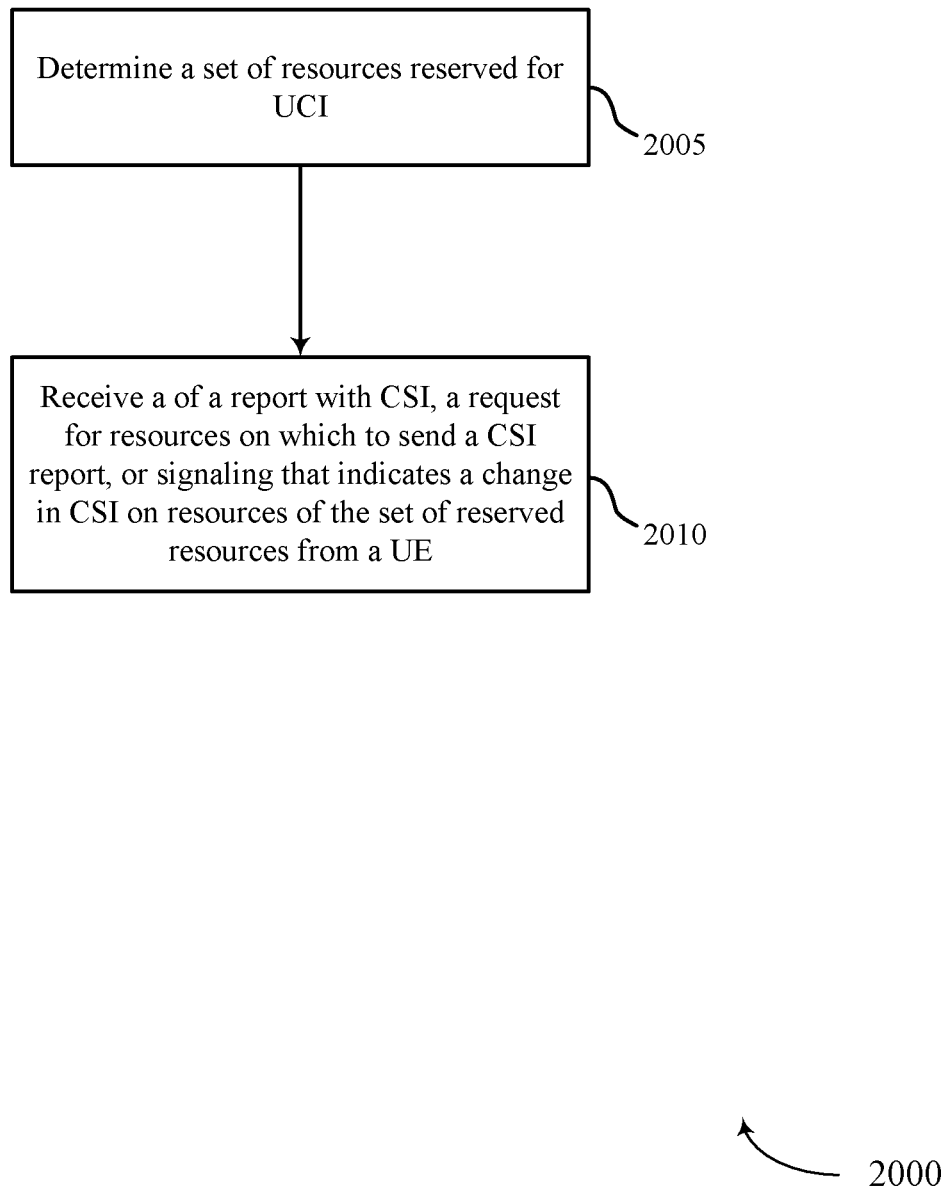

FIG. 20 shows a flowchart illustrating a method 2000 for low latency PUCCH with SR and CSI in accordance with various aspects of the present disclosure. The operations of method 2000 may be implemented by a base station 105 or its components as described with reference to FIGS. 1-14. For example, the operations of method 2000 may be performed by the base station low latency CSI module 1110 as described with reference to FIGS. 11-14. In some examples, a base station 105 may execute a set of codes to control the functional elements of the base station 105 to perform the functions described below. Additionally or alternatively, the base station 105 may perform aspects the functions described below using special-purpose hardware.

At block 2005, the base station 105 may determine a set of resources reserved for UCI as described with reference to FIGS. 2-6. In certain examples, the operations of block 2005 may be performed by the UCI resource identification module 1205 as described with reference to FIG. 12 or the base station low latency CSI module 1410 in combination with the transceiver 1435 as described with reference to FIG. 14.

At block 2010, the base station 105 may receive at least one of a report with CSI, a request for resources on which to send a CSI report, or signaling that indicates a change in CSI on resources of the set of reserved resources from a UE, and the receive may include receive using a first TTI duration in a system that supports operation with the first TTI duration and a second TTI duration that is greater than the first as described with reference to FIGS. 2-6. In certain examples, the operations of block 2010 may be performed by the CSI reception module 1210 as described with reference to FIG. 12 or the base station low latency CSI module 1410 in combination with the transceiver 1435 as described with reference to FIG. 14.

Thus, methods 1500, 1600, 1700, 1800, 1900, and 2000 may provide for low latency PUCCH with SR and CSI. It should be noted that methods 1500, 1600, 1700, 1800, 1900, and 2000 describe possible implementation, and that the operations and the steps may be rearranged or otherwise modified such that other implementations are possible. In some examples, aspects from two or more of the methods 1500, 1600, 1700, 1800, 1900, and 2000 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, Universal Mobile Telecommunications System (UMTS), LTE, LTE-A, and Global System for Mobile communications (GSM) are described in documents from an organization named "Third Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for frequency division duplex (FDD) (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," "component," and the like may not be a substitute for the word "means." As such, no claim element is to be construed as a means plus function unless the element is expressly recited using the phrase "means for."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication at a user equipment (UE), comprising:
   identifying resources of an uplink channel on which the UE is to transmit a report with channel state information (CSI), the resources including at least a first resource block and a second resource block, wherein the resources for the UE to transmit the report with CSI are on different respective symbols of the first resource block and the second resource block;
   transmitting, via both the first resource block and the second resource block, the report with the CSI for a communication link that uses a first transmission time interval (TTI) duration in a system that supports operation with the first TTI duration and a second TTI duration that is greater than the first;
   determining a change in a channel state for the communication link; and
   transmitting signaling that includes a difference between the CSI and the change in the channel state, wherein at least one of the report with the CSI or the signaling that includes the difference between the CSI and the change in the channel state is transmitted with a different cyclic shift from an uplink reference signal.

2. The method of claim 1, wherein the report with the CSI or the signaling that includes the difference between the CSI and the change in the channel state is transmitted on resources selected from a set of resources reserved for uplink control information (UCI).

3. The method of claim 2, wherein the set of resources reserved for UCI comprises resources reserved for scheduling request (SR), CSI reports, hybrid automatic repeat request (HARQ) feedback, or any combination thereof.

4. The method of claim 2, wherein the set of resources reserved for UCI is reserved based at least in part on a number of UEs for which the set of resources reserved for UCI is allocated, and wherein the number of UEs comprises coherent users or non-coherent users, or both.

5. The method of claim 1, further comprising:
   receiving a grant for resources on which to send the report with the CSI or the signaling that indicates the difference between the CSI and the change in the channel state in a downlink data channel.

6. An apparatus for wireless communication, comprising:
   a processor;
   memory in electronic communication with the processor; and
   instructions stored in the memory and operable, when executed by the processor, to cause the apparatus to:
   identify resources of an uplink channel on which the apparatus is to transmit a report with channel state information (CSI), the resources including at least a first resource block and a second resource block, wherein the resources for the apparatus to transmit the report with CSI are on different respective symbols of the first resource block and the second resource block;
   transmit, via both the first resource block and the second resource block, the report with the CSI for a communication link that uses a first transmission time interval (TTI) duration in a system that supports operation with the first TTI duration and a second TTI duration that is greater than the first;
   determine a change in a channel state for the communication link; and
   transmit signaling that includes a difference between the CSI and the change in the channel state, wherein at least one of the report with the CSI or the signaling that includes the difference between the CSI and the change in the channel state is transmitted with a different cyclic shift from an uplink reference signal.

7. The apparatus of claim 6, wherein the report with the CSI or the signaling that includes the difference between reported CSI and the change in the channel state is transmitted on resources selected from a set of resources reserved for uplink control information (UCI).

8. The apparatus of claim 7, wherein the set of resources reserved for UCI comprises resources reserved for scheduling request (SR), CSI reports, hybrid automatic repeat request (HARQ) feedback, or any combination thereof.

9. The apparatus of claim 7, wherein the set of resources reserved for UCI is reserved based at least in part on a number of UEs for which the set of resources reserved for UCI is allocated, and wherein the number of UEs comprises coherent users or non-coherent users, or both.

10. The apparatus of claim 6, wherein the instructions are operable to cause the apparatus to:
    receive a grant for resources on which to send the report with the CSI or the signaling that indicates the difference between the CSI and the change in the channel state in a downlink data channel.

11. An apparatus for wireless communication, comprising:
    means for identifying resources of an uplink channel on which the apparatus is to transmit a report with channel state information (CSI), the resources including at least a first resource block and a second resource block, wherein the resources for the apparatus to transmit the report with CSI are on different respective symbols of the first resource block and the second resource block;
    means for transmitting, via both the first resource block and the second resource block, the report with the CSI for a communication link that uses a first transmission time interval (TTI) duration in a system that supports operation with the first TTI duration and a second TTI duration that is greater than the first;
    means for determining a change in a channel state for the communication link; and
    means for transmitting signaling that includes a difference between the CSI and the change in the channel state, wherein at least one of the report with the CSI or the signaling that includes the difference between the CSI and the change in the channel state is transmitted with a different cyclic shift from an uplink reference signal.

12. The apparatus of claim 11, wherein the report with the CSI or the signaling that includes the difference between the CSI and the change in the channel state is transmitted on resources selected from a set of resources reserved for uplink control information (UCI).

13. The apparatus of claim 12, wherein the set of resources reserved for UCI comprises resources reserved for scheduling request (SR), CSI reports, hybrid automatic repeat request (HARQ) feedback, or any combination thereof.

14. The apparatus of claim 12, wherein the set of resources reserved for UCI is reserved based at least in part on a number of UEs for which the set of resources reserved for UCI is allocated, and wherein the number of UEs comprises coherent users or non-coherent users, or both.

15. The apparatus of claim 11, further comprising:
means for receiving a grant for resources on which to send the report with the CSI or the signaling that indicates the difference between the CSI and the change in the channel state in a downlink data channel.

* * * * *